(12) United States Patent
Sindhu et al.

(10) Patent No.: US 6,493,347 B2
(45) Date of Patent: *Dec. 10, 2002

(54) MEMORY ORGANIZATION IN A SWITCHING DEVICE

(75) Inventors: Pradeep S. Sindhu; Dennis C. Ferguson, both of Mountain View; Bjorn O. Liencres, Palo Alto; Nalini Agarwal, Sunnyvale; Hann-Hwan Ju, San Jose; Raymond Marcelino Manese Lim, Mountain View; Rasoul Mirzazadeh Oskouy, Fremont; Sreeram Veeragandham, Sunnyvale, all of CA (US)

(73) Assignee: Juniper Networks, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/901,061

(22) Filed: Jul. 24, 1997

(65) Prior Publication Data

US 2001/0010692 A1 Aug. 2, 2001

Related U.S. Application Data

(63) Continuation-in-part of application No. 08/844,171, filed on Apr. 18, 1997, now Pat. No. 5,905,725, which is a continuation-in-part of application No. 08/767,576, filed on Dec. 16, 1996, now Pat. No. 5,909,440.

(51) Int. Cl.$^7$ ................................................ H04L 12/56

(52) U.S. Cl. ...................... 370/401; 370/395.1; 370/389

(58) Field of Search .................................. 370/395, 389, 370/396, 397, 351, 352, 354, 355, 428, 412, 429, 413, 414–418, 442, 368, 363, 353, 398, 395.1, 395.31, 395.53, 395.6, 395.61, 395.64, 395.65, 395.7, 395.71, 399, 401, 475; 340/825.01, 825.03

(56) References Cited

U.S. PATENT DOCUMENTS 4,058,672 A 11/1977 Crager et al.
4,596,010 A 6/1988 Beckner et al.

(List continued on next page.)

OTHER PUBLICATIONS

Arpaci, Multu, Copeland, John A., Buffer Management For Shared–Memory ATM Switches, IEEE Communications Surveys & Tutorialsl, First Quarter 2000, pp. 2–10, vol. 3 No. 1.

Verma, Sanjeev, ATM Switch Architectures, A Report in The Department of Electrical and Computer Engineering, Concordia University, Montreal, Quebec, Canada, Aug. 1994, pp. 1–81.

Primary Examiner—Dang Ton

(57) ABSTRACT

A router for switching data packets from a source to a destination in a network in which the router includes a distributed memory. The distributed memory includes two or more memory banks. Each memory bank is used for storing uniform portions of a data packet received from a source and linking information for each data packet to allow for the extraction of the uniform portions of a data packet from distributed locations in memory in proper order after a routing determination has been made by the router.

18 Claims, 22 Drawing Sheets

U.S. PATENT DOCUMENTS

| | | |
|---|---|---|
| 4,884,264 A | 11/1989 | Servel et al. |
| 4,885,744 A | 12/1989 | Lespagnol et al. |
| 4,926,416 A | 5/1990 | Weik |
| 4,933,932 A | 6/1990 | Quinquis et al. |
| 4,947,388 A | 8/1990 | Kuwahara et al. |
| 5,214,639 A | 5/1993 | Herion |
| 5,448,702 A | 9/1995 | Garcia et al. ............... 395/325 |
| 5,457,687 A | 10/1995 | Newman .................... 370/85.3 |
| 5,491,694 A | 2/1996 | Oliver et al. ............... 370/85.4 |
| 5,521,910 A | 5/1996 | Matthews .................... 370/54 |
| 5,796,944 A | 8/1998 | Hill et al. |
| 5,802,052 A | 9/1998 | Venkataraman |
| 5,905,725 A * | 5/1999 | Sindhu et al. ............... 370/389 |
| 5,909,440 A * | 6/1999 | Ferguson et al. ........... 370/408 |

\* cited by examiner

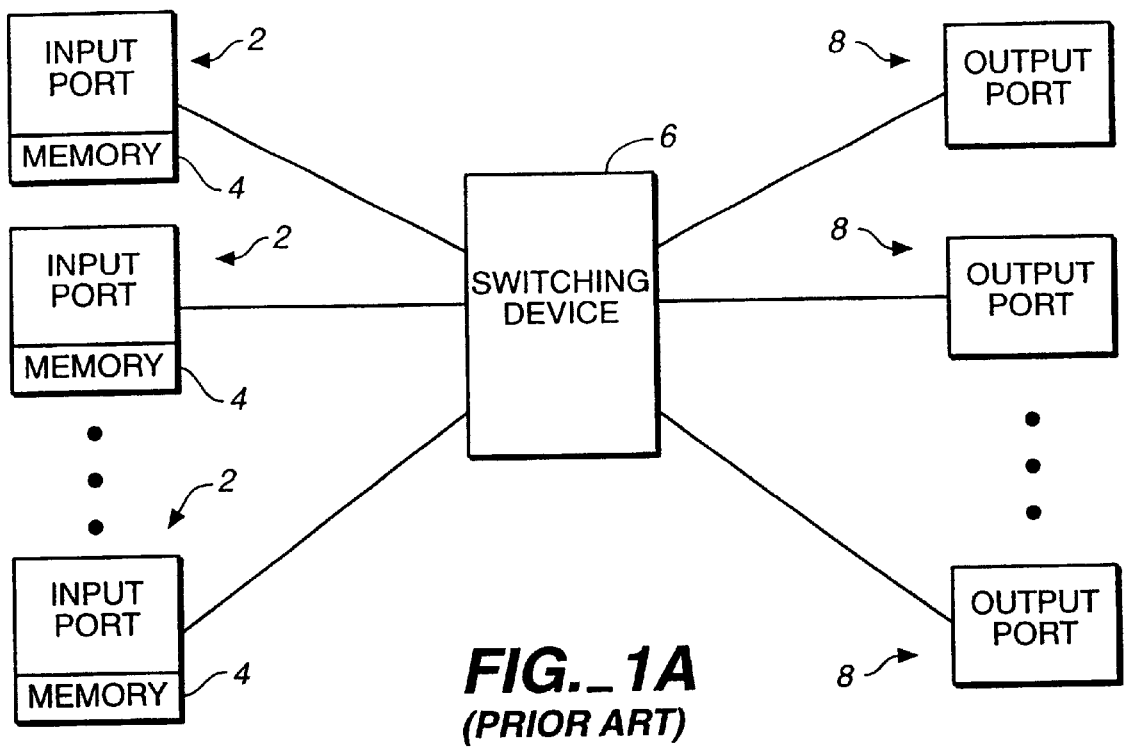
FIG._1A
*(PRIOR ART)*
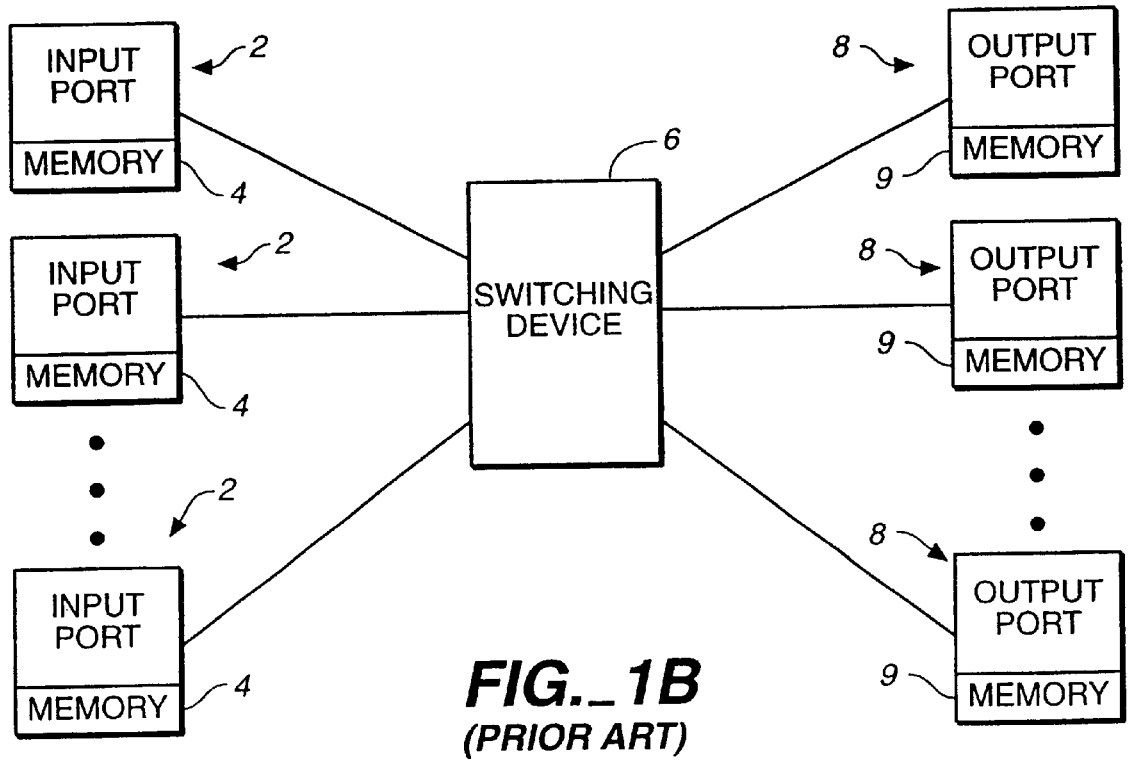
FIG._1B
*(PRIOR ART)*

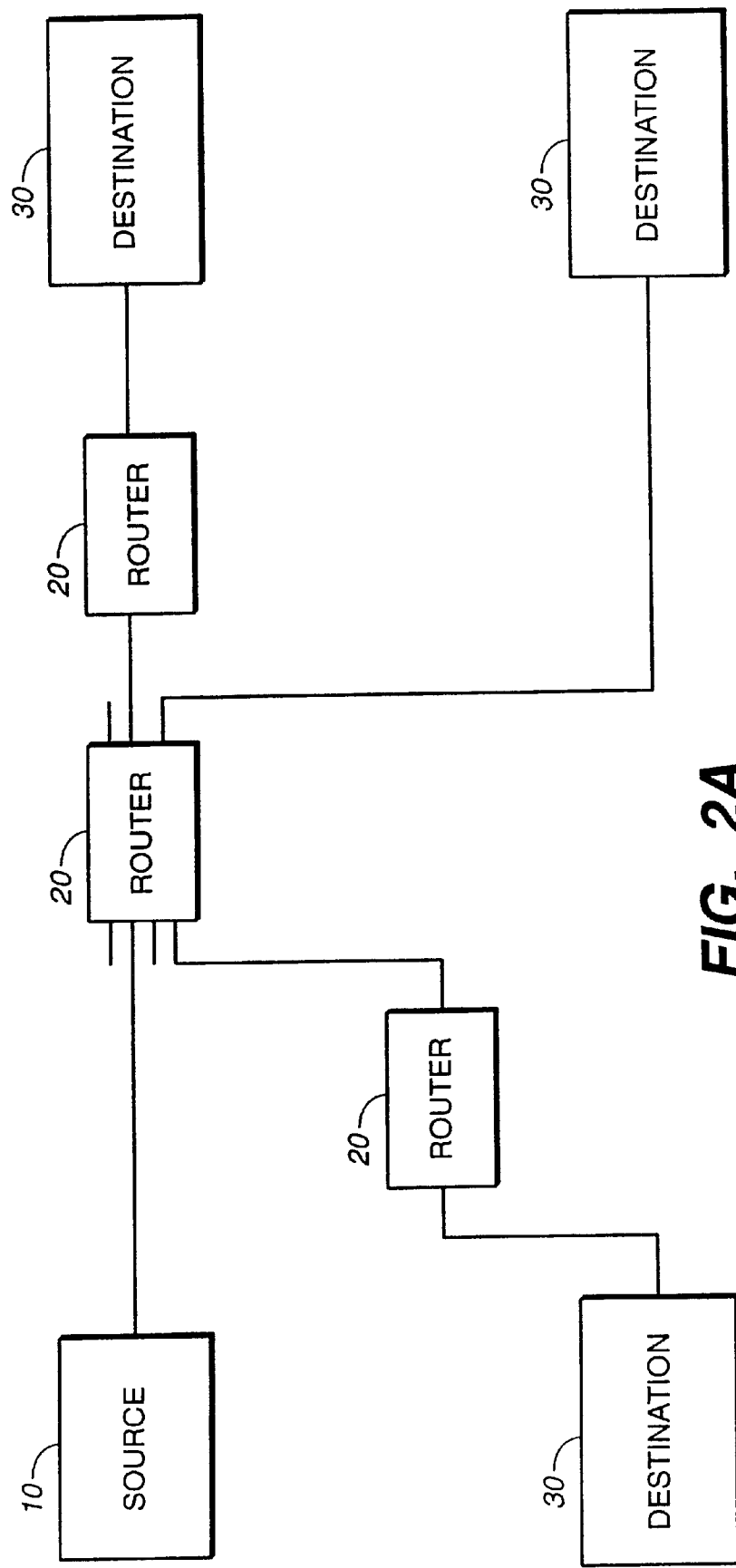
FIG._2A

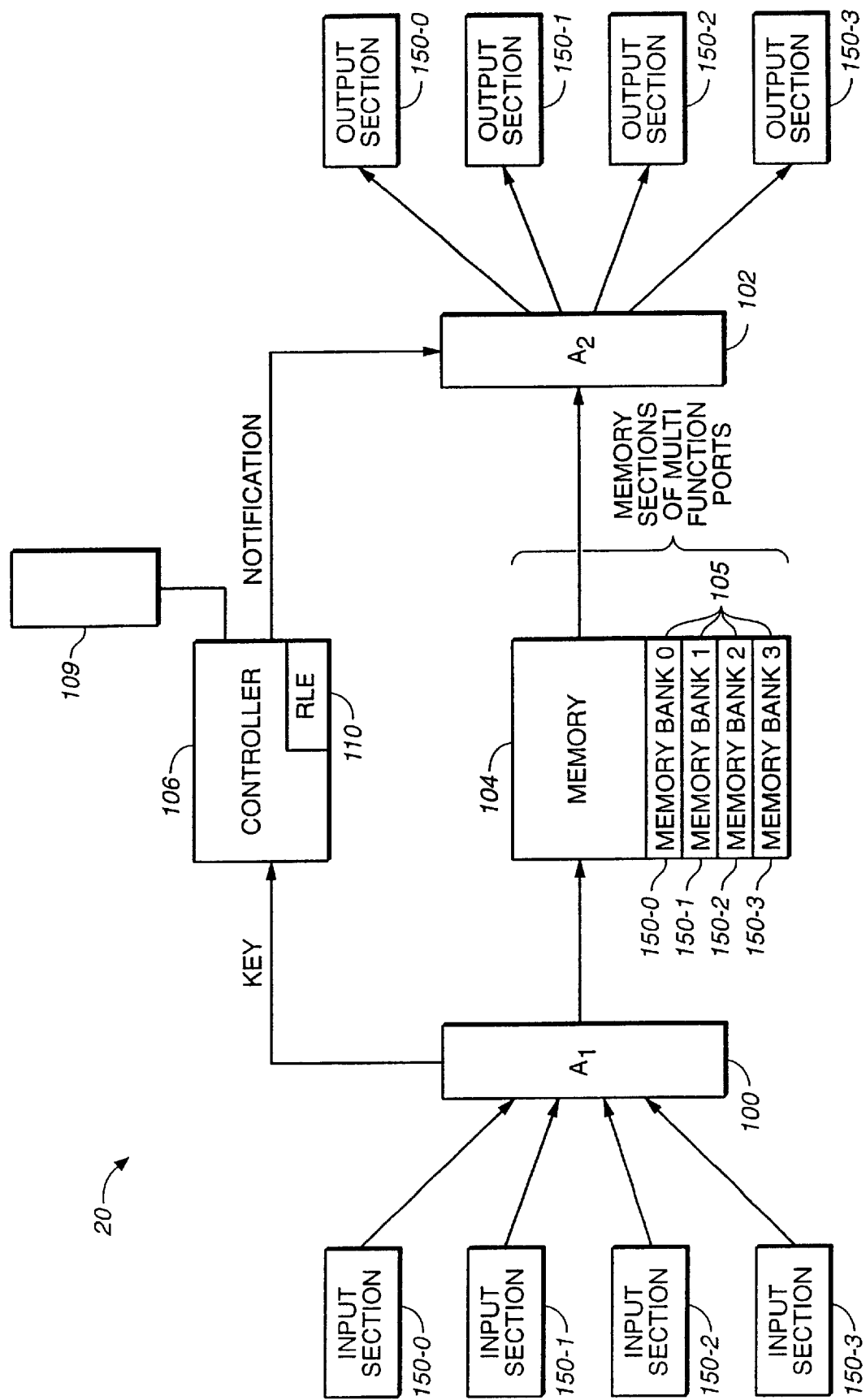
FIG._2B

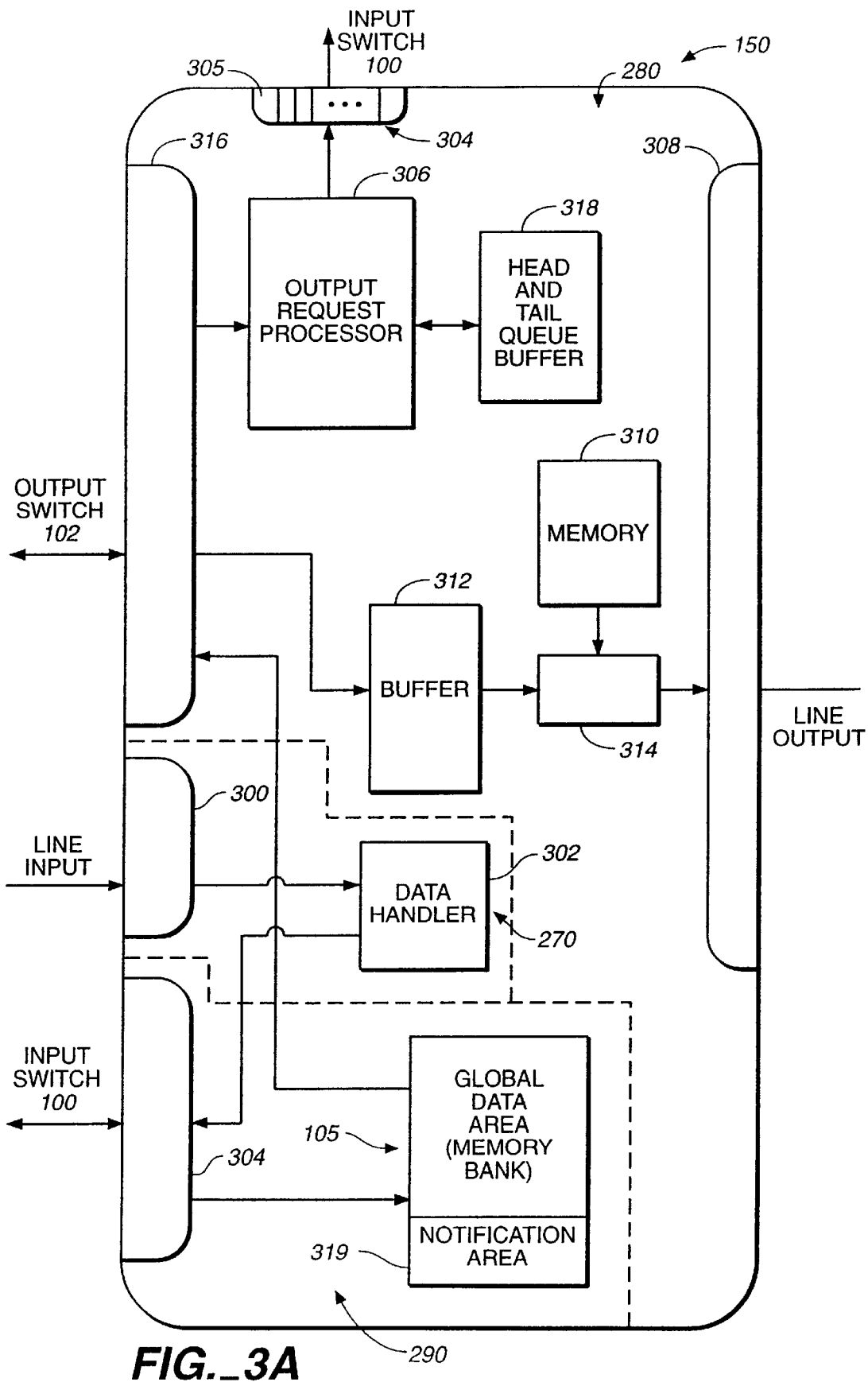
FIG._3A

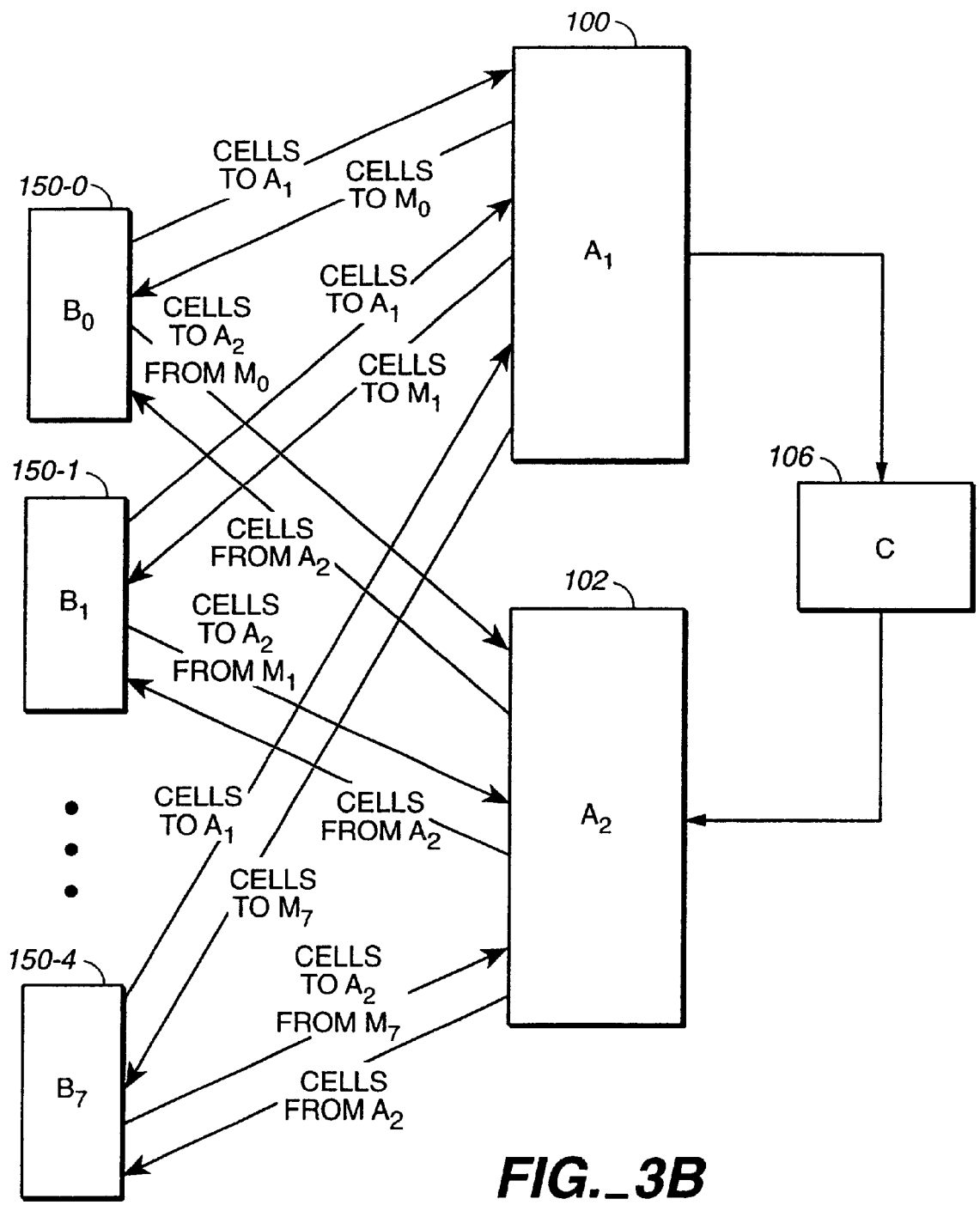
FIG._3B

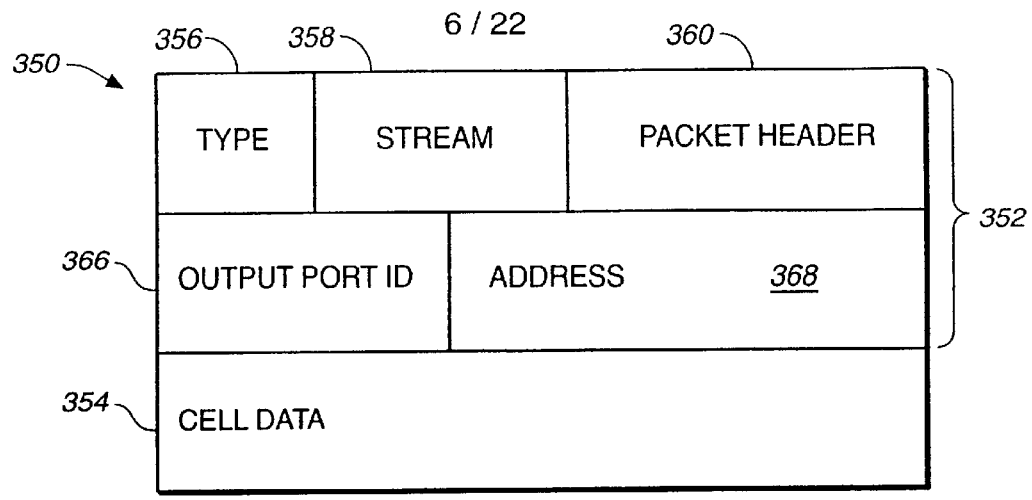
FIG._3C
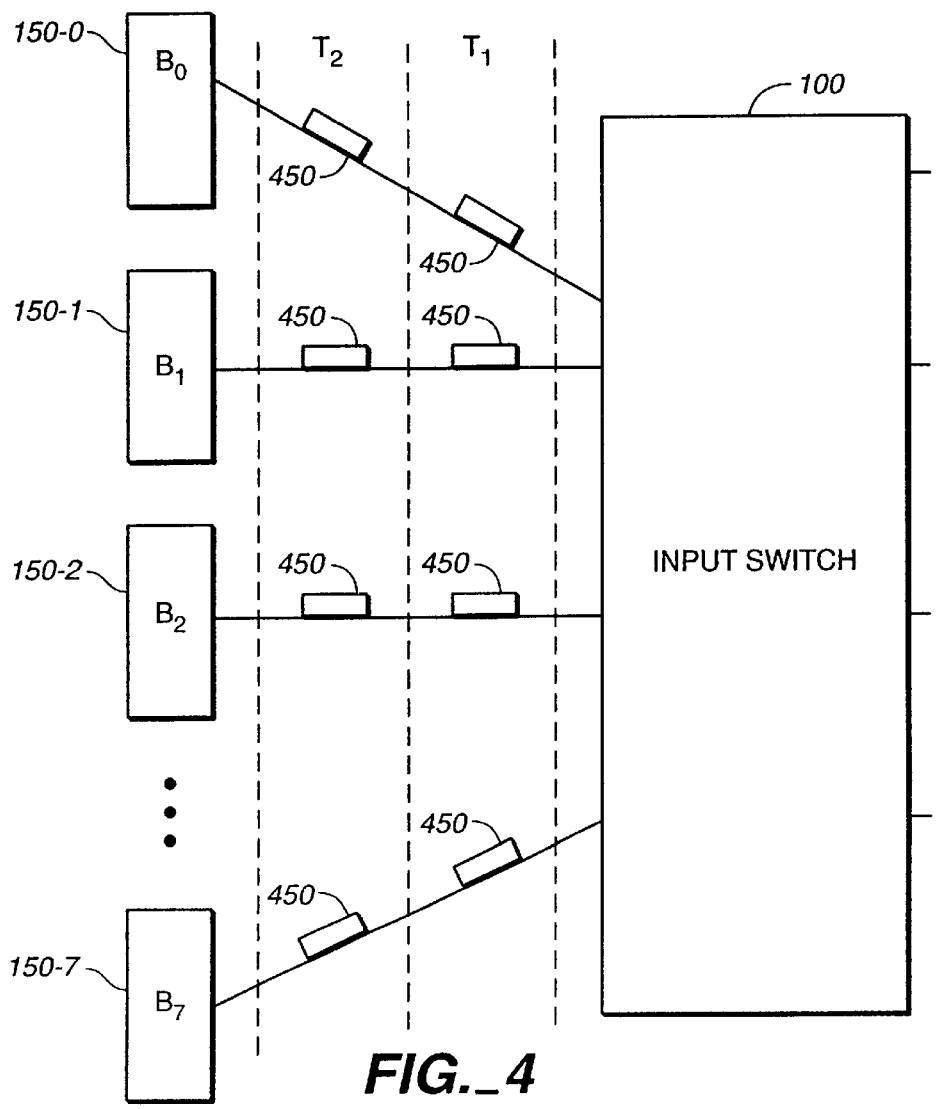
FIG._4

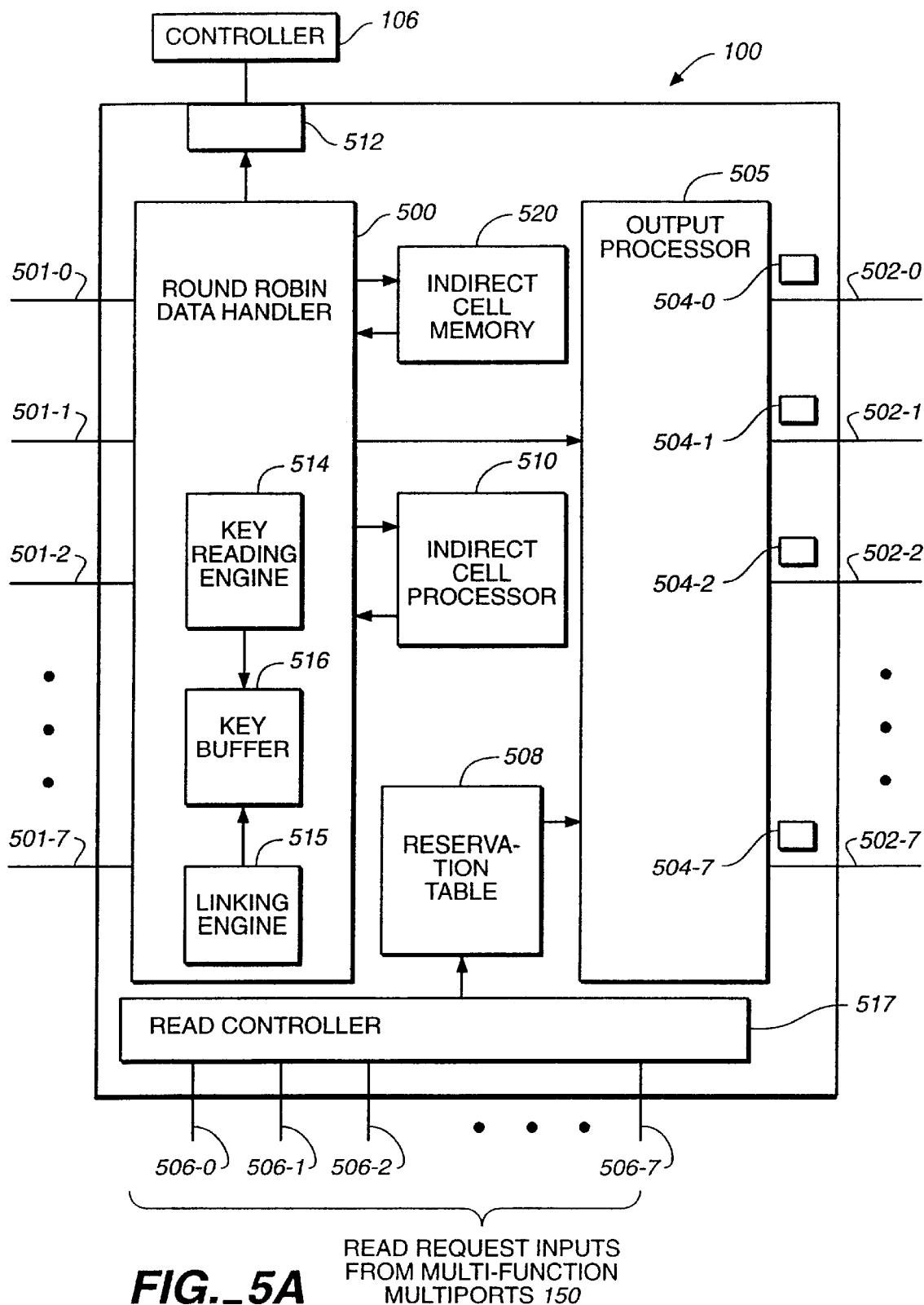
FIG._5A
READ REQUEST INPUTS FROM MULTI-FUNCTION MULTIPORTS 150

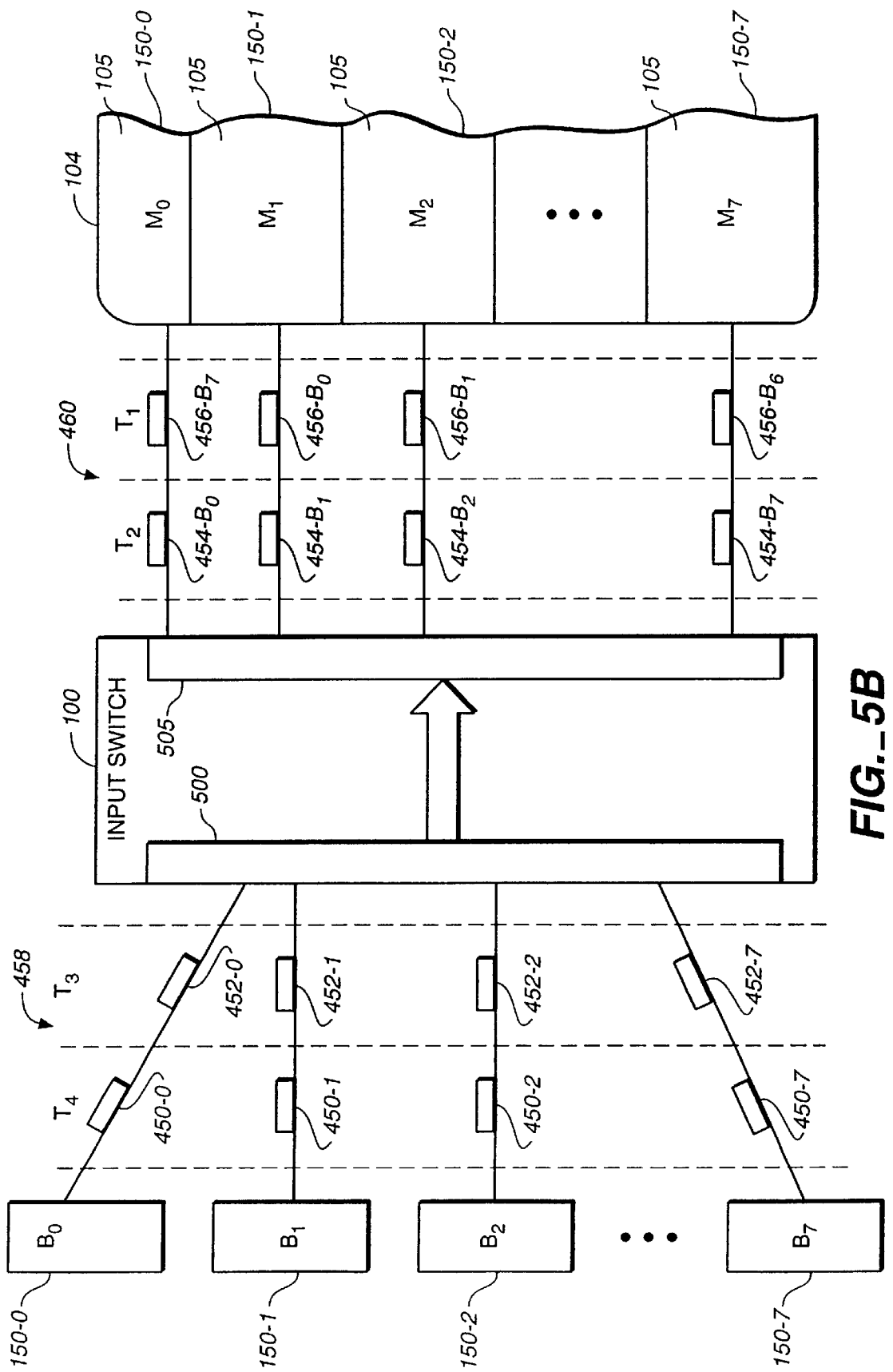
FIG._5B

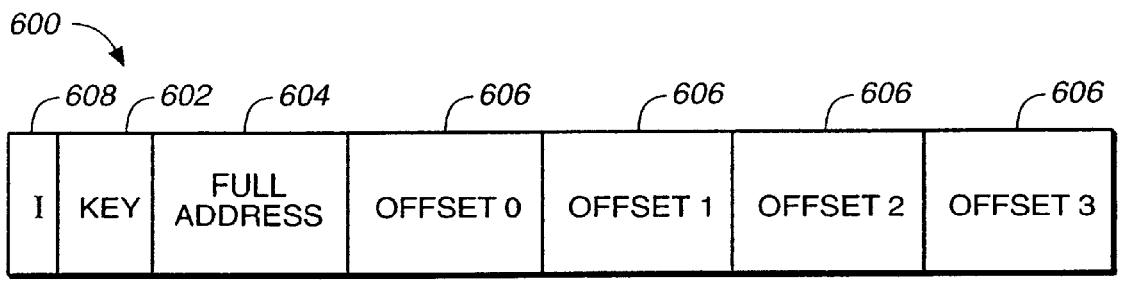
FIG._6
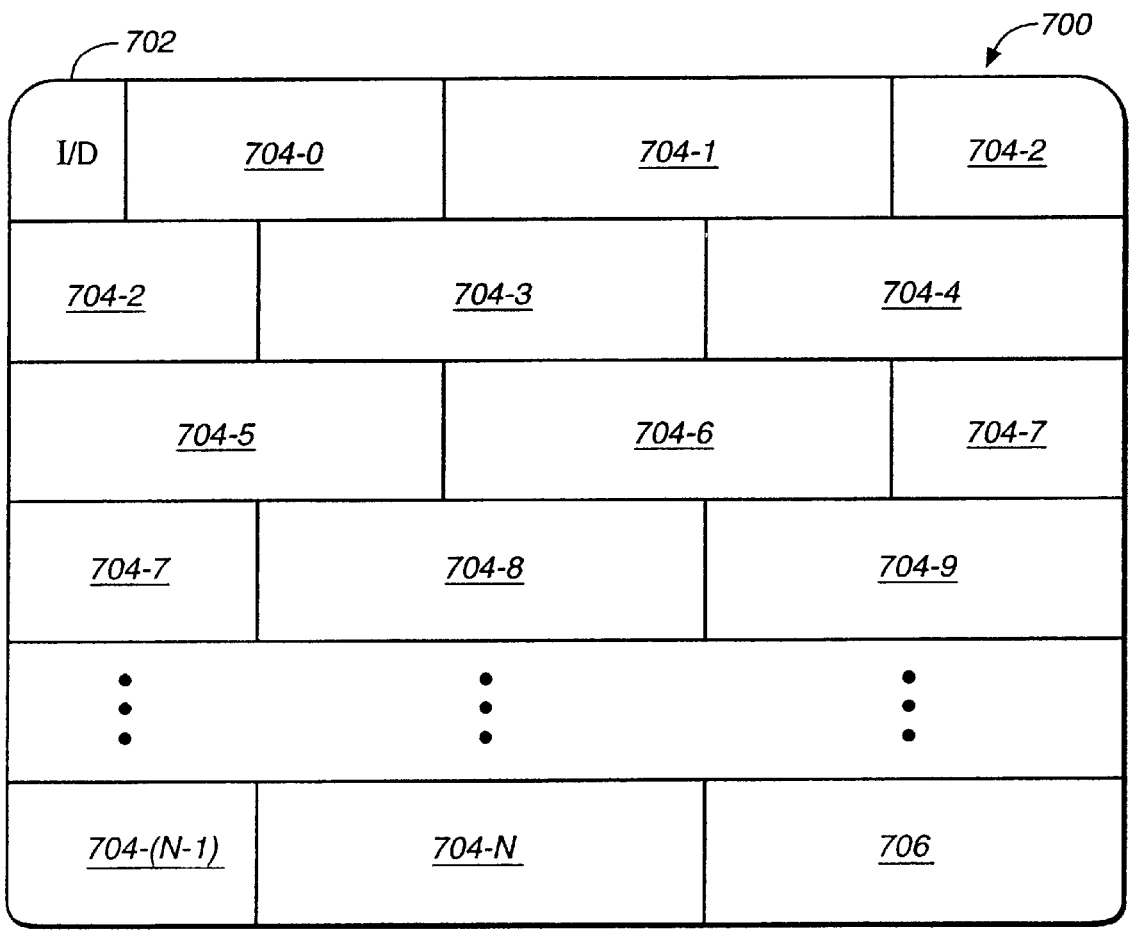
FIG._7

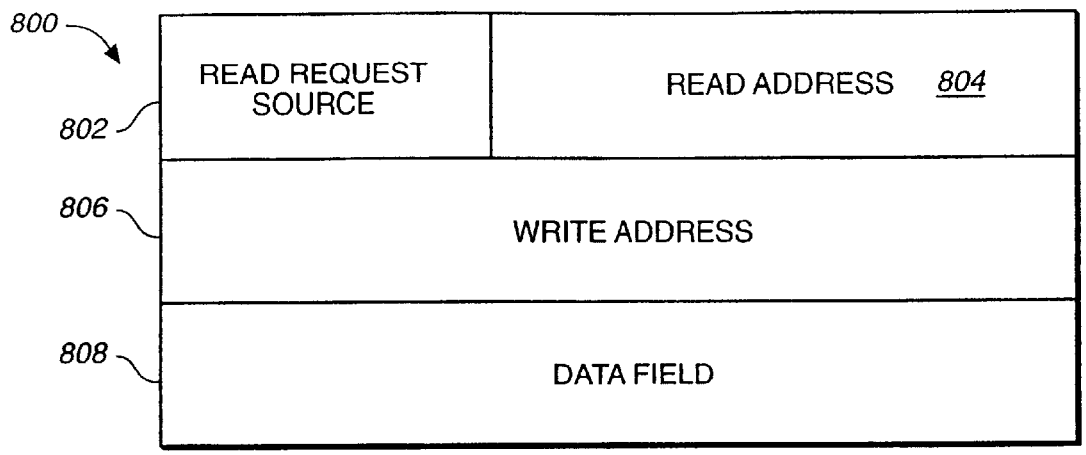
FIG._8
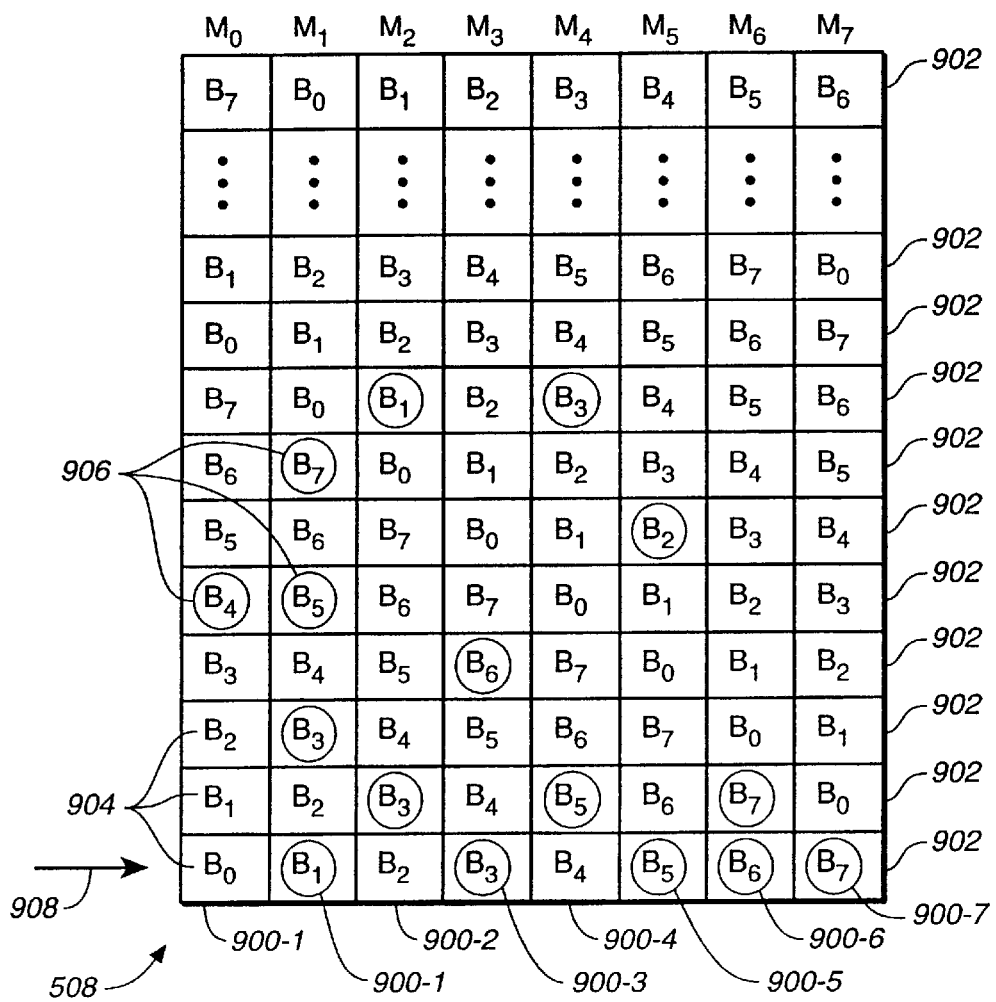
FIG._9

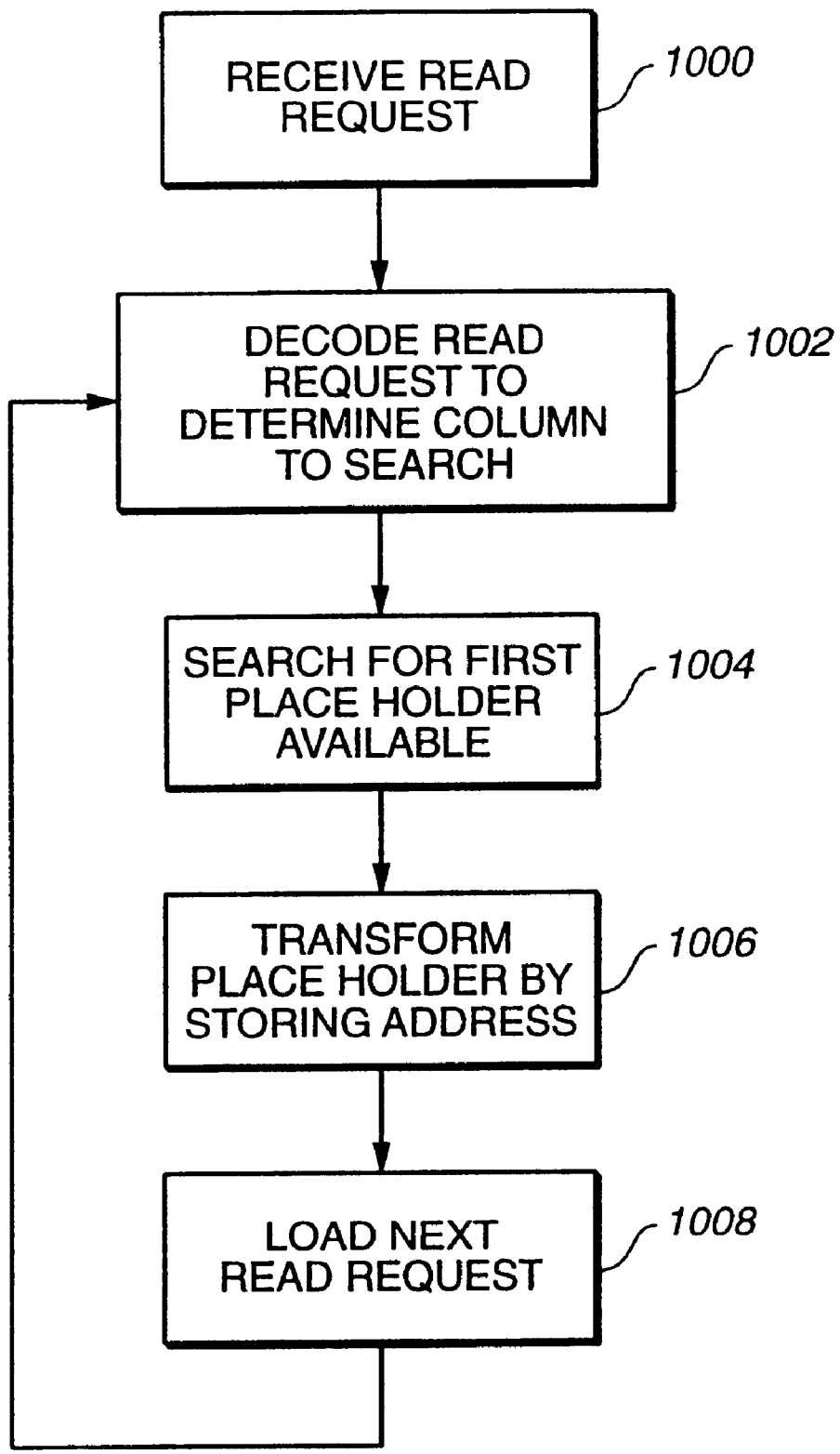
FIG._10

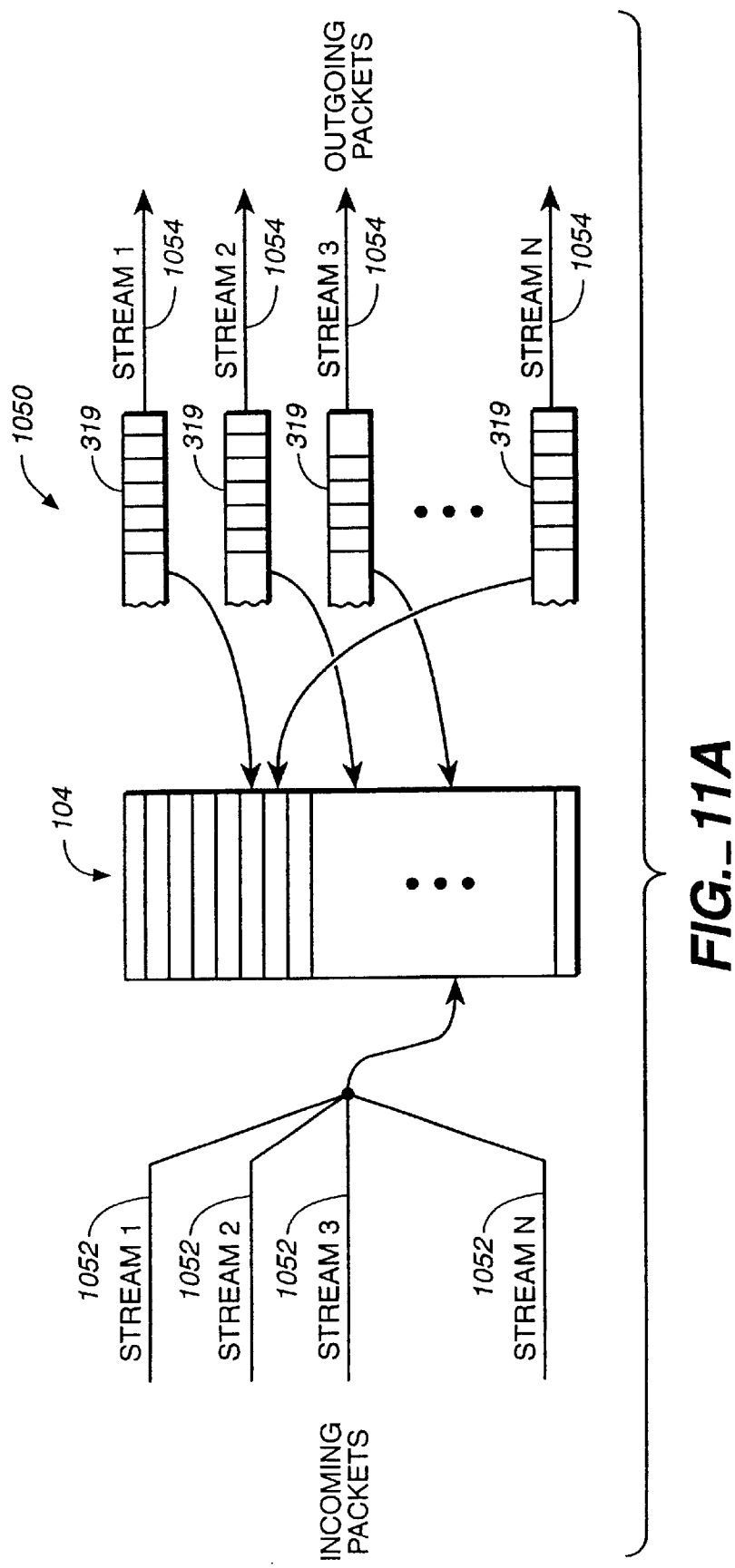
FIG._11A

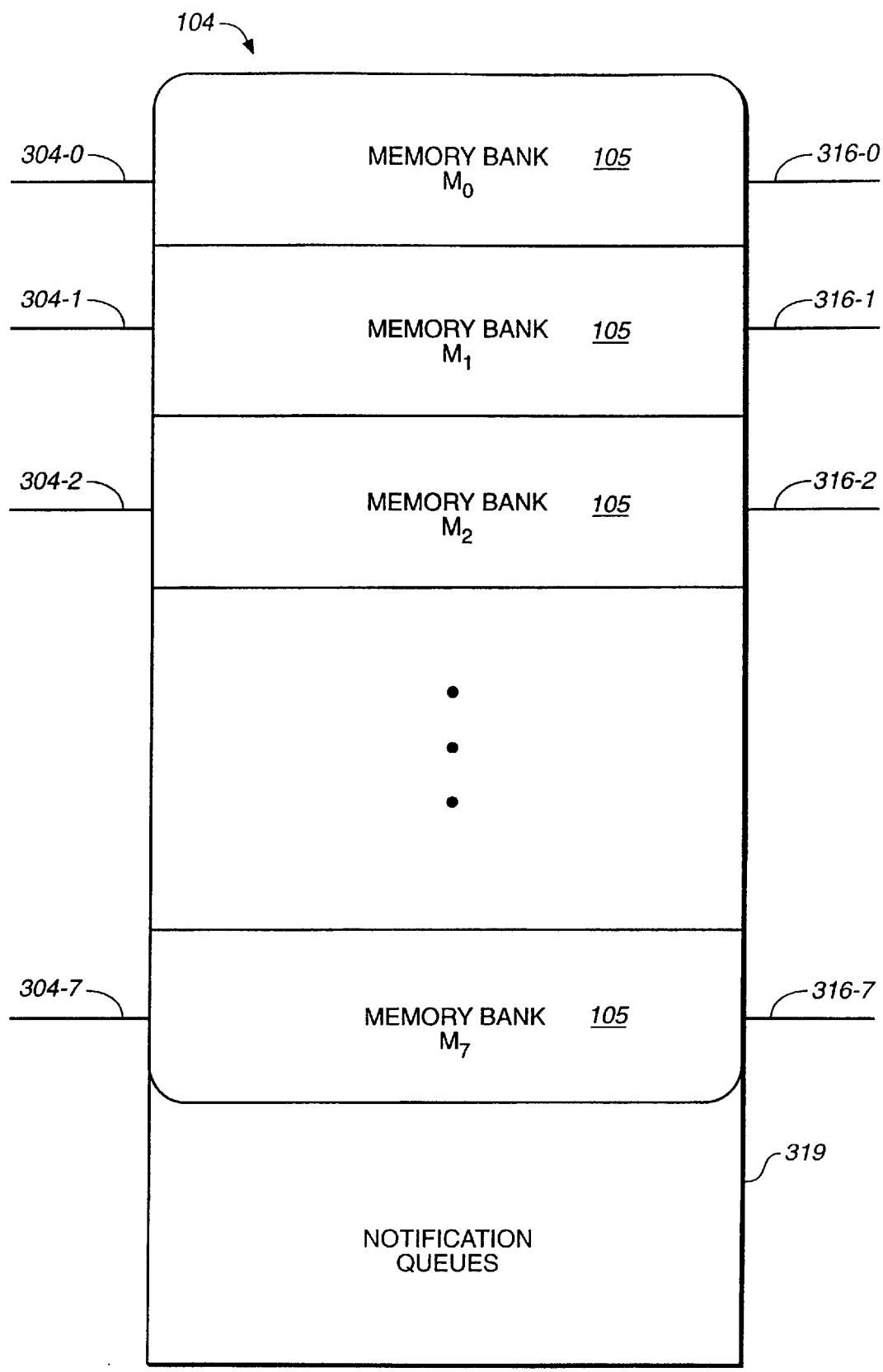
FIG._11B

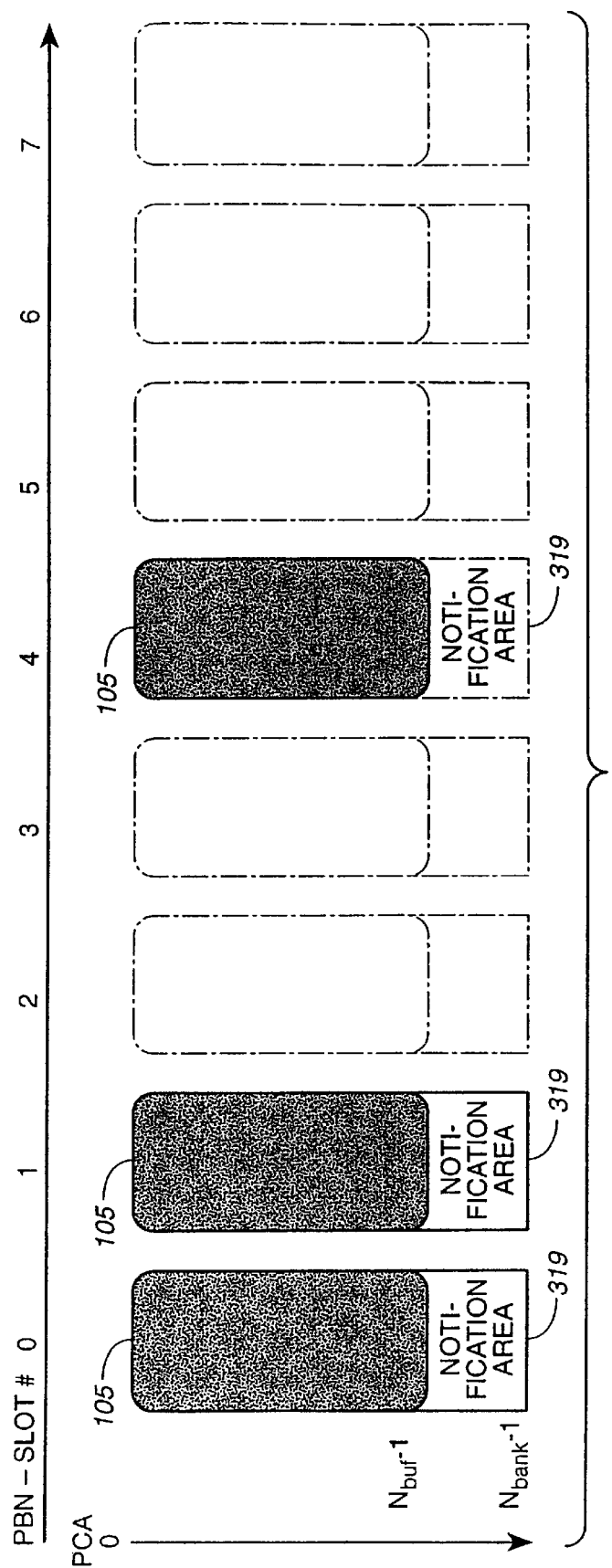
FIG._11C

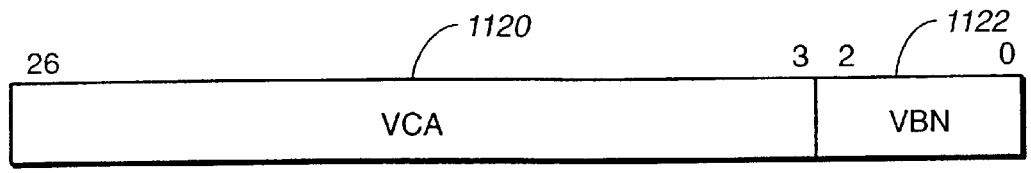
FIG._11D
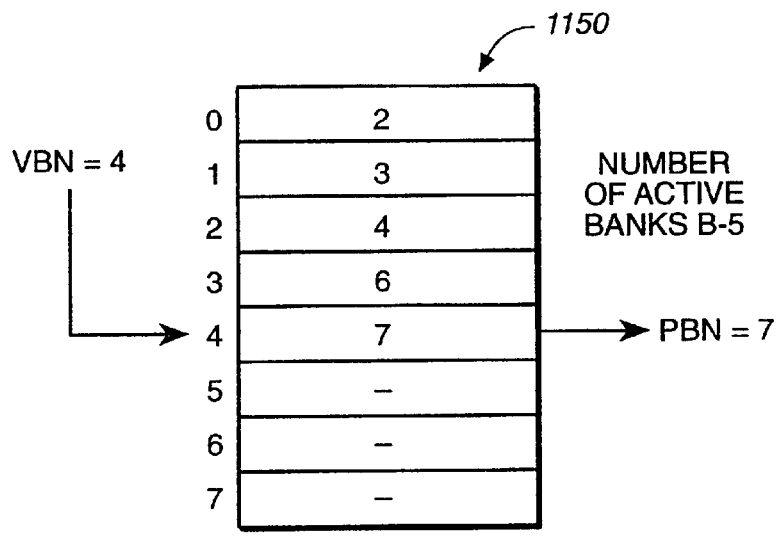
FIG._11E
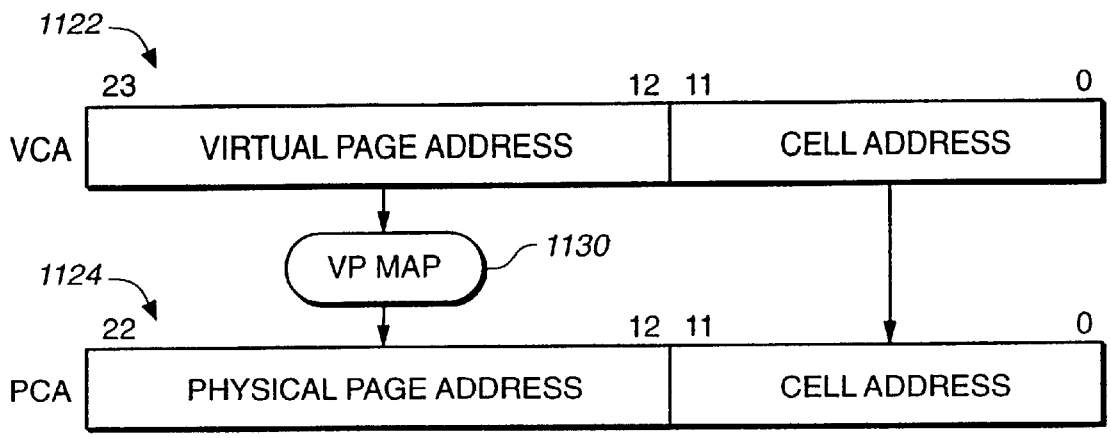
FIG._11F

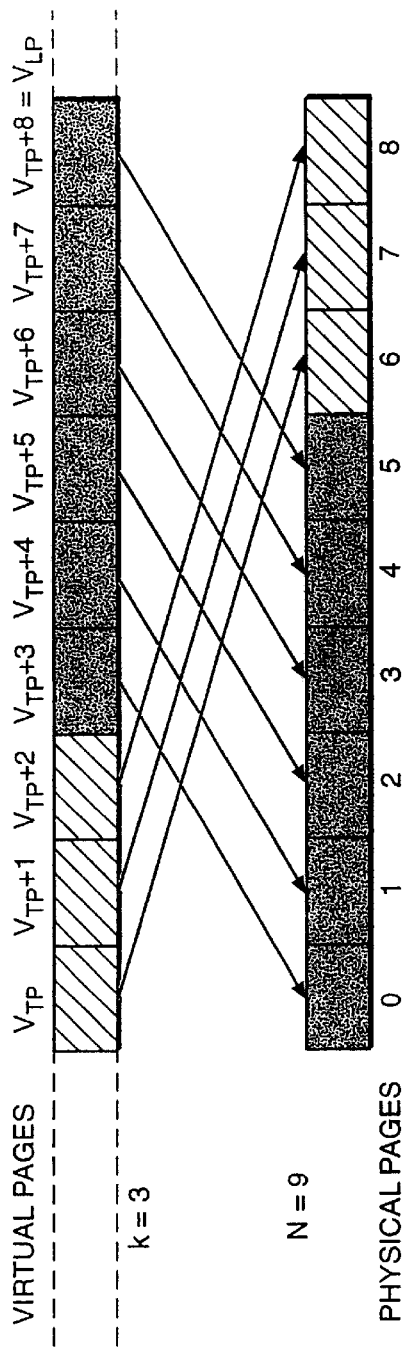
FIG._11G
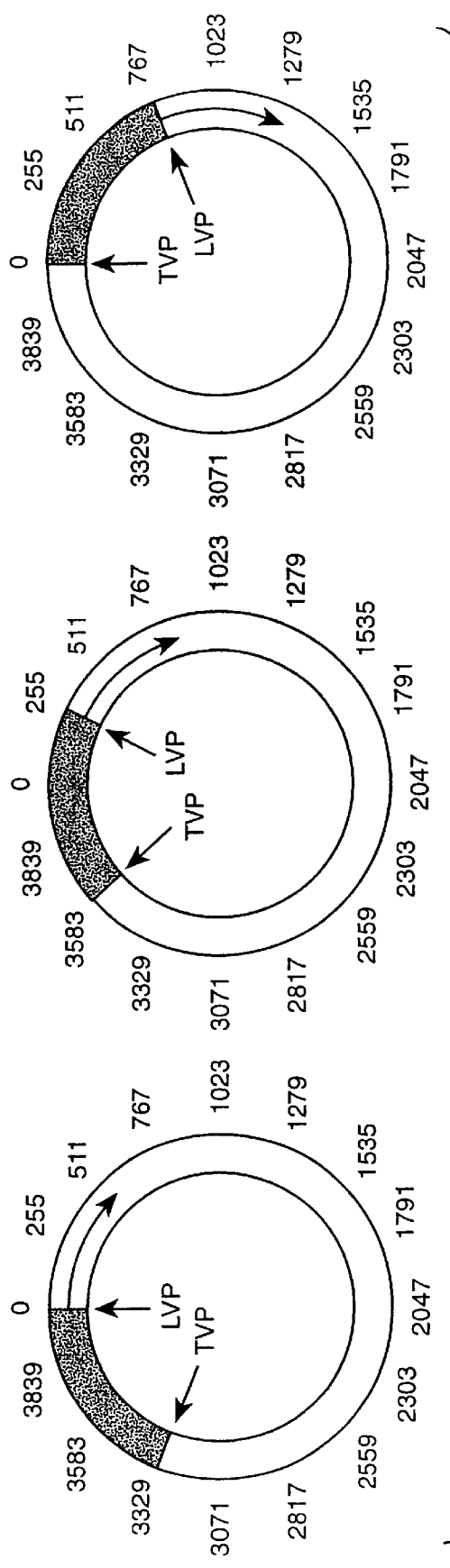
FIG._11H

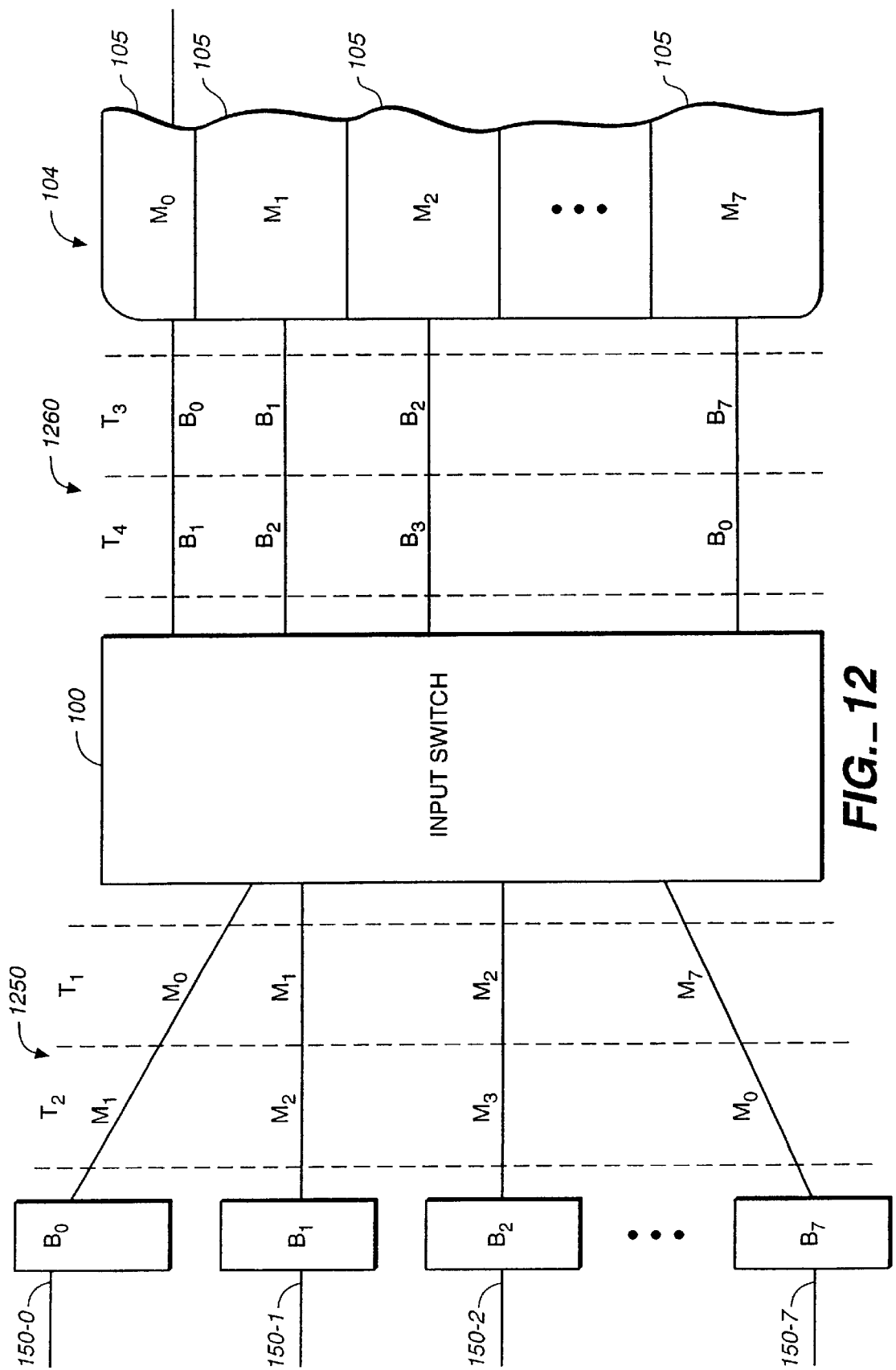
FIG._12

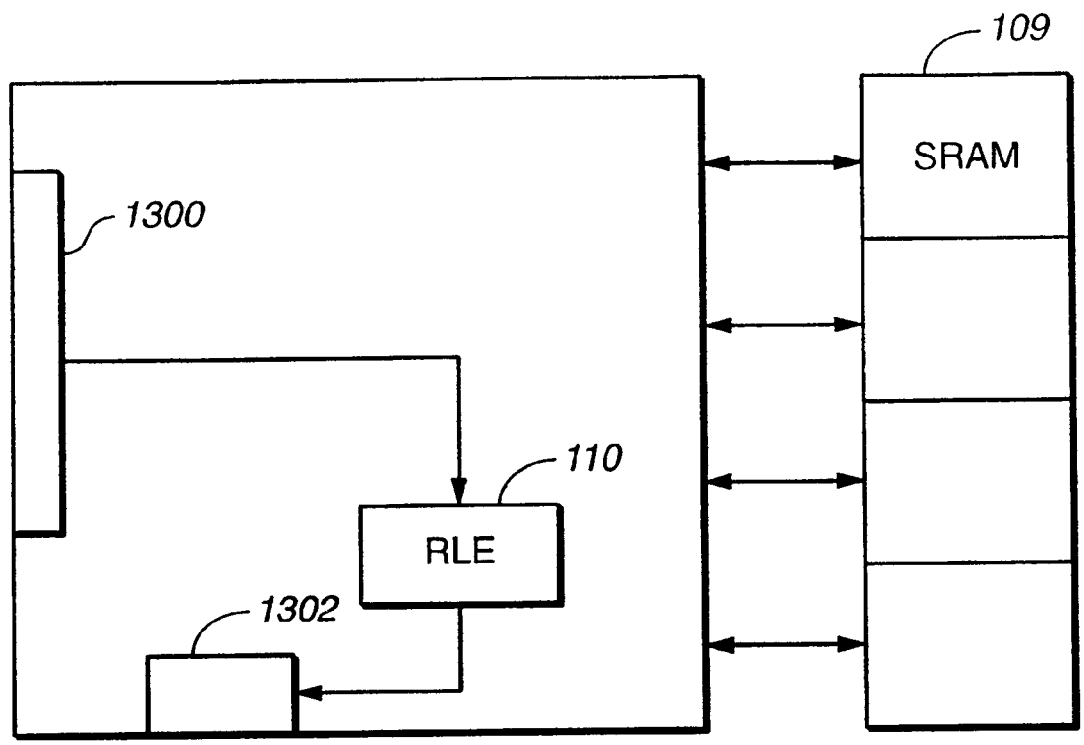
FIG._13
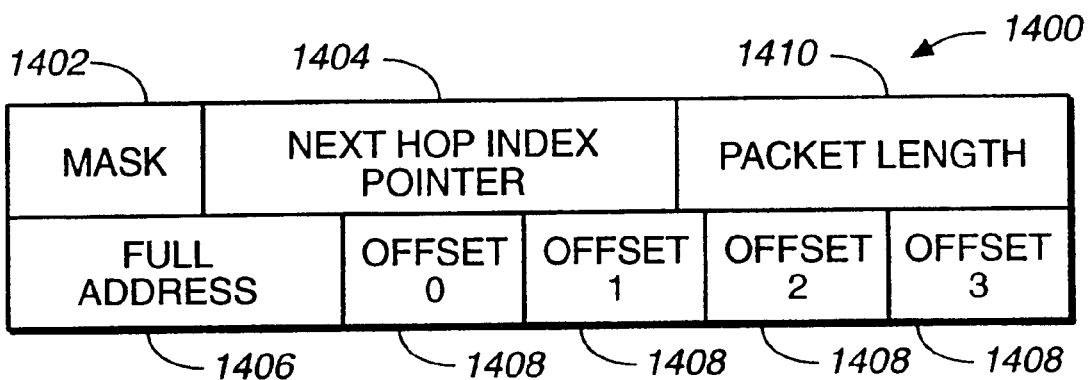
FIG._14

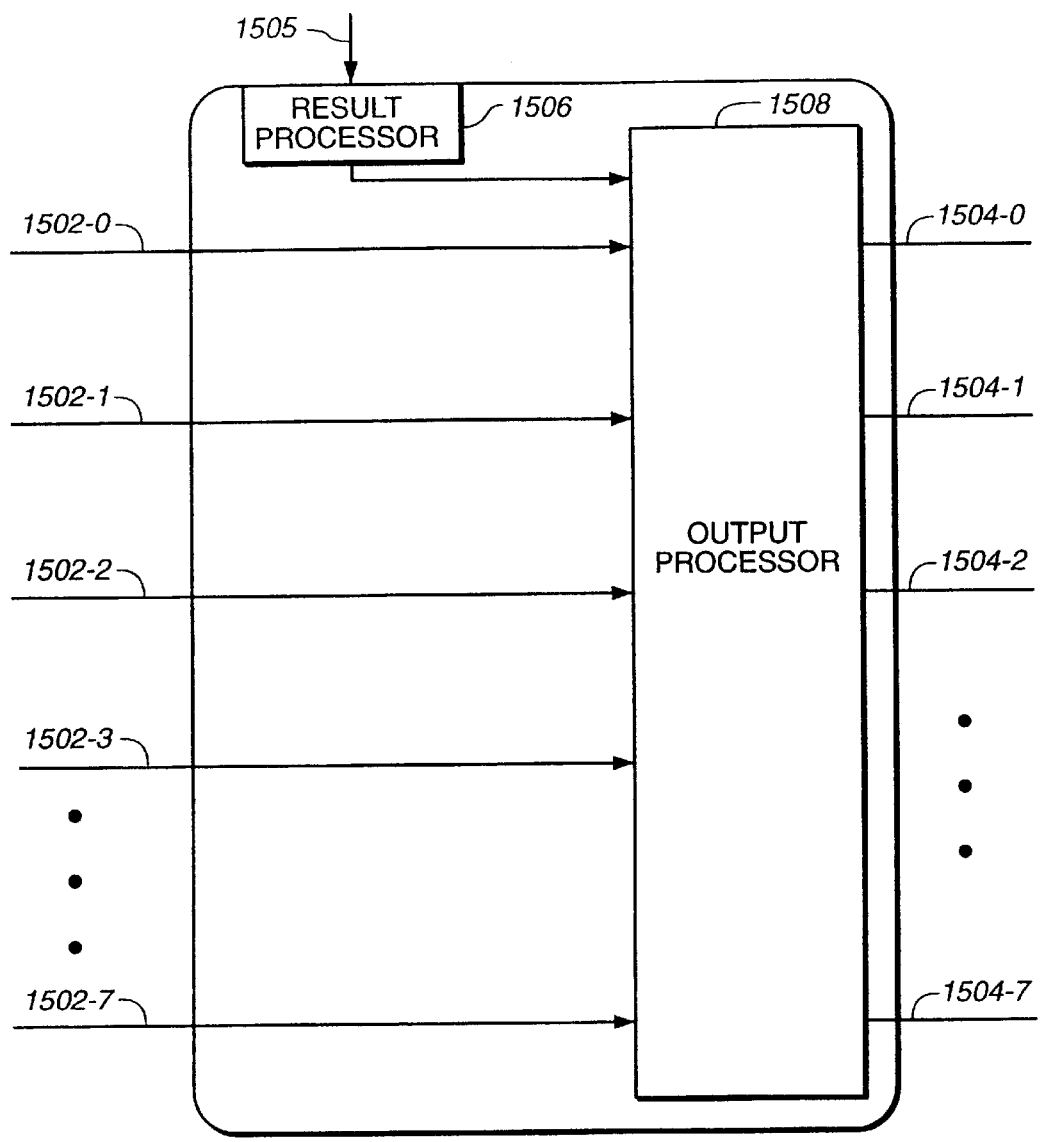
FIG._15A
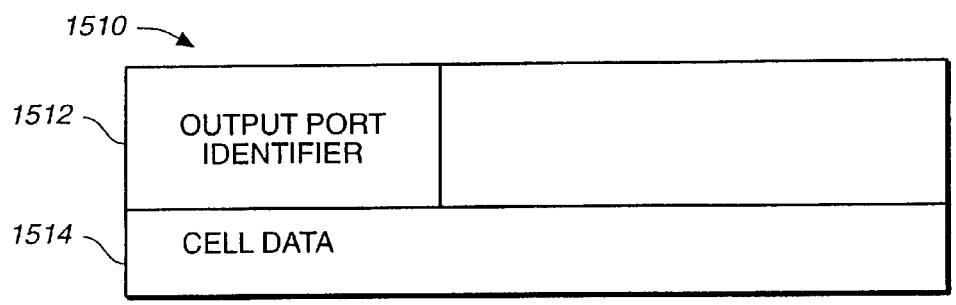
FIG._15B

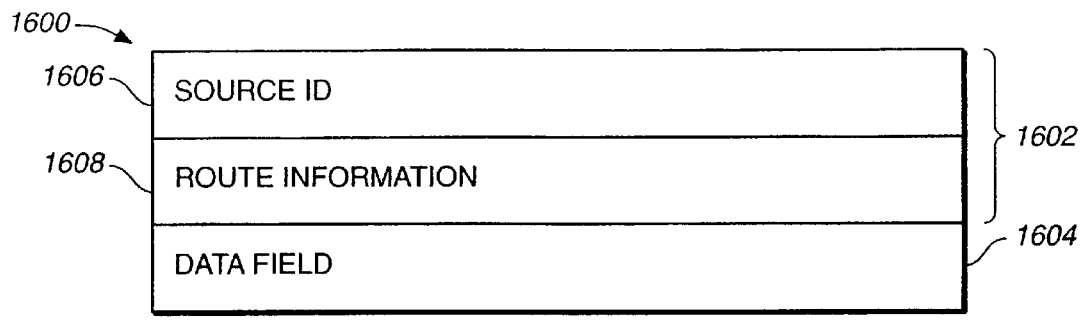
FIG._16
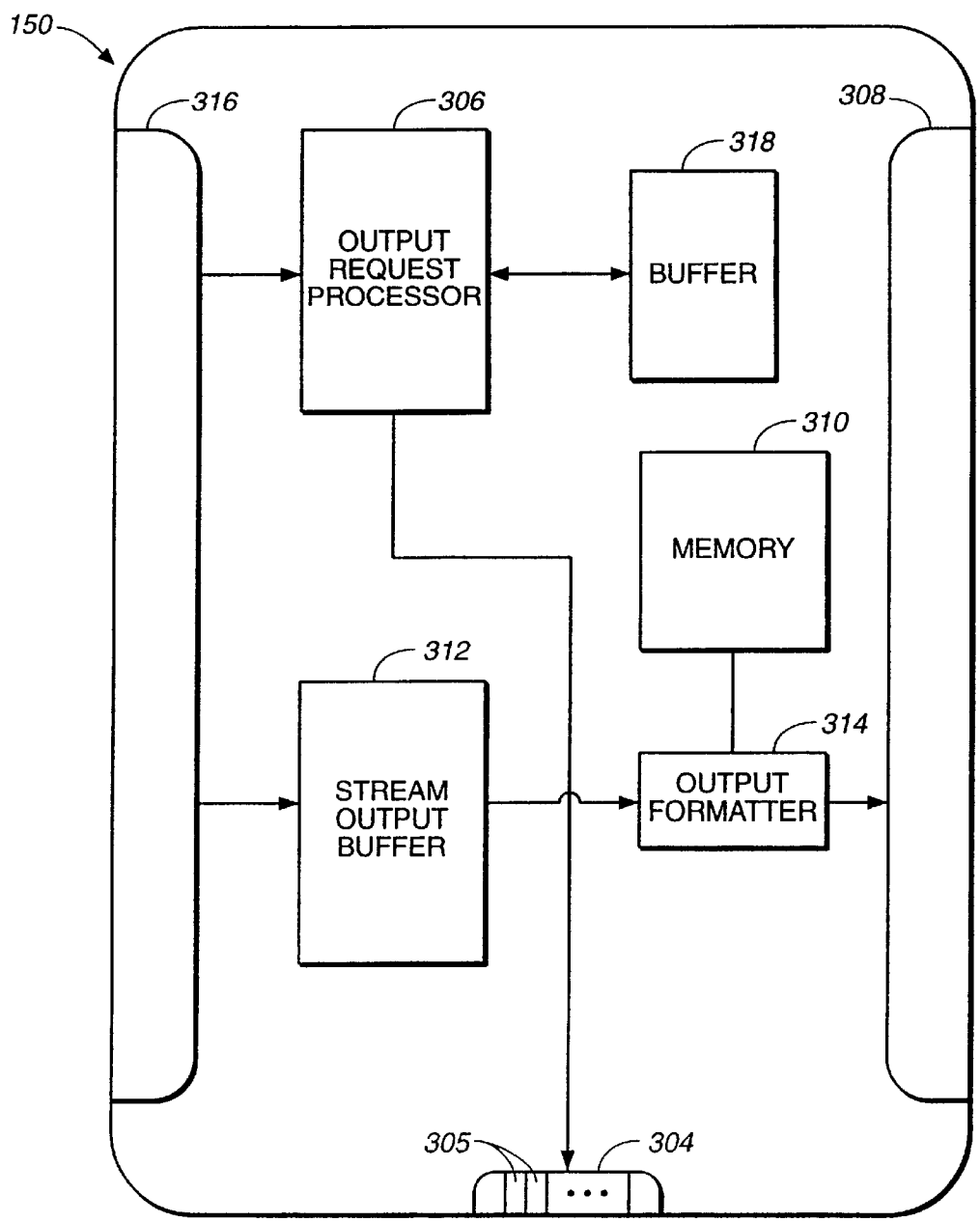
FIG._17A

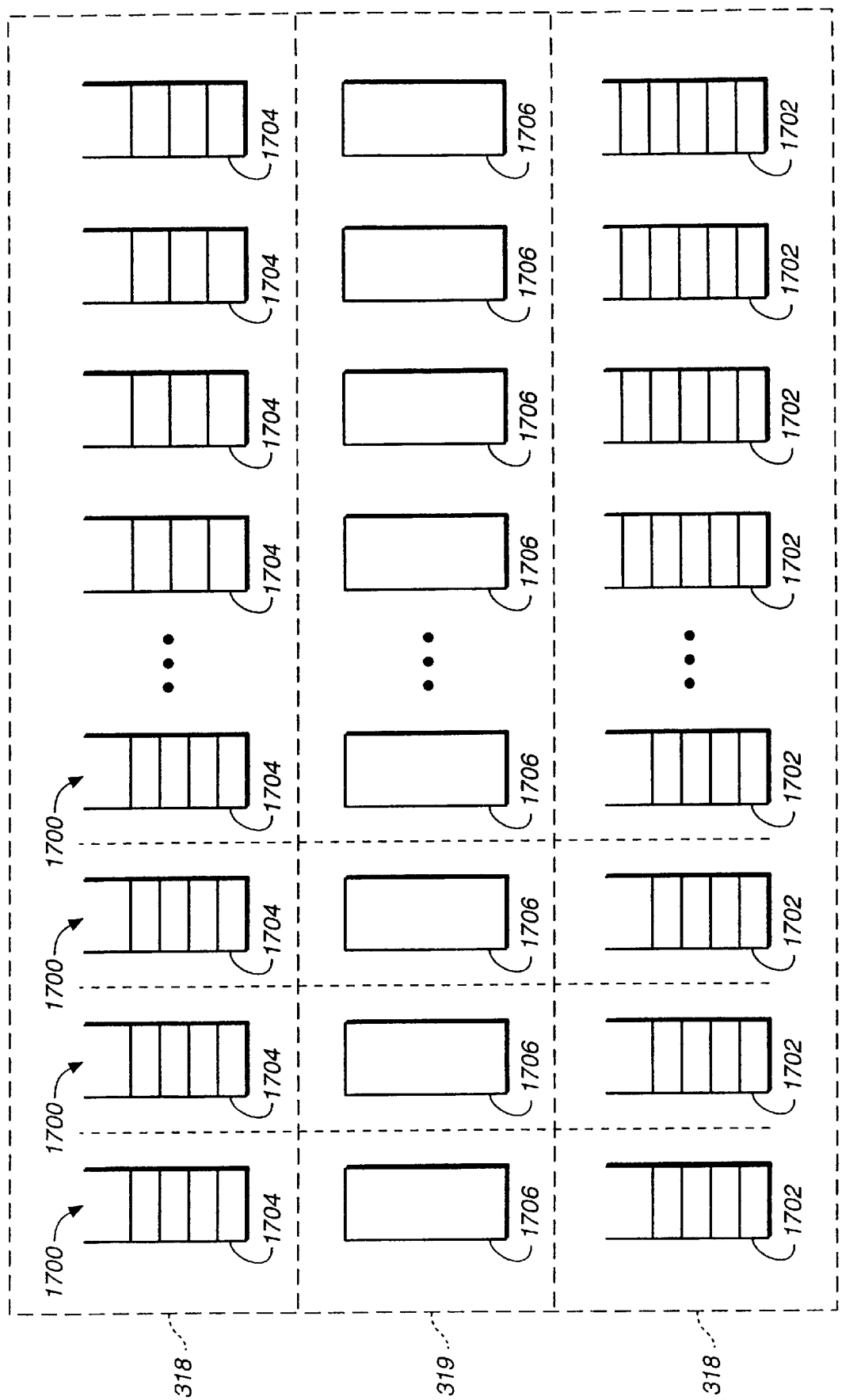
FIG._17B

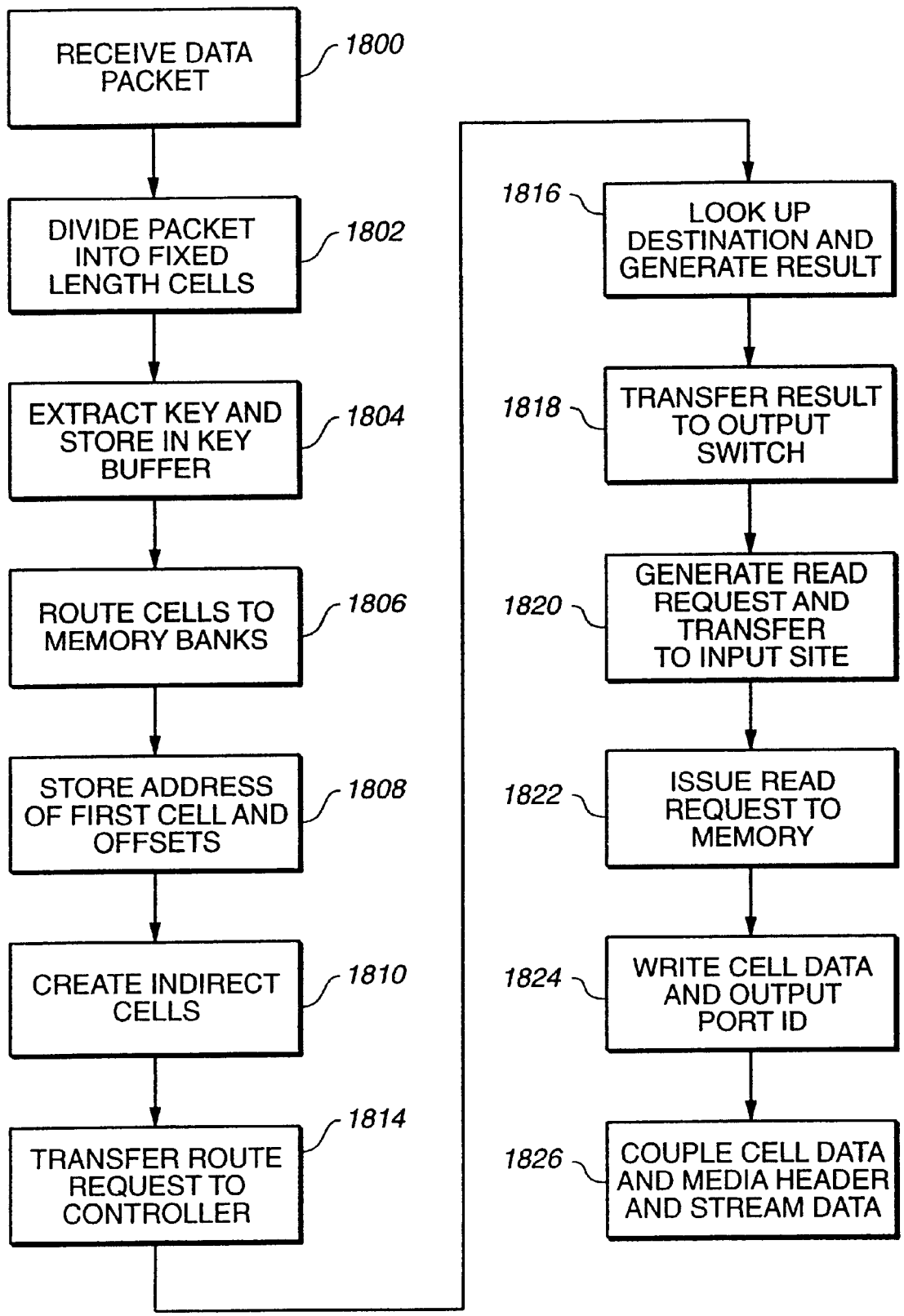
FIG._18

MEMORY ORGANIZATION IN A SWITCHING DEVICE

This is a continuation-in-part of U.S. application Ser. No. 08/844,171, entitled "HIGH SPEED SWITCHING DEVICE", filed Apr. 18, 1997, now U.S. Pat. No. 5,905,725, which is a continuation-in-part of U.S. application Ser. No. 08/767,576, entitled "HIGH SPEED VARIABLE LENGTH BEST MATCH LOOK-UP IN A SWITCHING DEVICE", filed on Dec. 16, 1996, now U.S. Pat. No. 5,909,440.

BACKGROUND

The present invention relates generally to data routing systems, and more particularly to methods and apparatus for efficiently routing packets through a network.

In packet switched communication systems, a router is a switching device which receives packets containing data or control information on one port, and based on destination information contained within the packet, routes the packet out another port to the destination (or an intermediary destination).

Conventional routers perform this switching function by evaluating header information contained within a first data block in the packet in order to determine the proper output port for a particular packet.

Efficient switching of packets through the router is of paramount concern. Referring now to FIG. 1a, a conventional router includes a plurality of input ports 2 each including an input buffer (memory) 4, a switching device 6 and a plurality of output ports 8.

Data packets received at an input port 2 are stored at least temporarily, in input buffer 4 while destination information associated with each packet is decoded to determine the appropriate switching through the switching device 6. The size of input buffer 4 is based in part on the speed with which the destination information may be decoded. If the decoding process takes too long as compared to the rate at which packets are received, large sized memory elements may be required or packets may be dropped.

In addition, the size of input buffer may be influenced by a condition referred to as "blocking". Packets may be forced to remain in the input buffer after the destination information is decoded if the switching device cannot make the connection. Blocking refers to a condition in which a connection cannot be made in the switch due to the unavailability of the desired output port (the port is busy, e.g., routing another packet from a different input port). In summary, the size of input buffer 4 is dependent on a number of factors including the line input rate, the speed of the look-up process, and the blocking characteristics for the switching device.

Unfortunately, conventional routers are inefficient in a number of respects. Each input port includes a dedicated input buffer and memory sharing between input ports is not provided for in the design. Each input buffer must be sized to meet the maximum throughput requirements for a given port. However, design trade-offs (cost) often necessitate smaller buffers for each port. With the smaller buffers, the possibility arises for packets to be dropped due to blocking conditions. While excess memory capacity typically exists in the router (due to the varied usage of the input ports), no means for taking advantage of the excess is afforded.

To minimize the occurrence of dropping packets, designers developed non head-of-line blocking routers. Referring now to FIG. 1b, a conventional non head-of-line blocking router includes a plurality of input ports 2 each including an input buffer (memory) 4, a switching device 6 and a plurality of output ports 8 each having an output buffer 9. In order to provide non head-of-line blocking, each output port 8 is configured to include an output buffer 9. Each output port could simultaneously be outputting packets as well as receiving new packets for output at a later time. As the size of the output buffer is increased, fewer packets are dropped due to head-of line blocking at input ports.

However, these designs are even more inefficient in terms of memory capacity and cost. Again, each output port includes a dedicated output buffer and memory sharing between output ports is not provided for in the design. Each output buffer must be sized to meet the maximum throughput requirements for a given port (in order to maintain its non head-of-line blocking characteristics). Even more excess memory capacity typically exists in the router (due to the varied usage of the input ports and output ports), yet no means for taking advantage of the excess is afforded. Twice the amount and bandwidth of memory has to be used than required to support the amount of data being moved through these types of devices.

SUMMARY OF THE INVENTION

In general, in one aspect, the invention provides a router for switching data packets from a source to a destination in a network. The router includes an input port for receiving a data packet and a physically distributed memory including two or more banks. Each memory bank includes a global data area for storing portions of the data packet. The router further includes an input switch for streaming across the memory banks uniform portions of the data packet, a controller for determining packet routing through the router, an output switch for extracting in order the portions of packet data stored in the global data area of each memory bank and forwarding the packet data to an appropriate output port and an output port for transferring the data packet to the destination.

In another aspect the invention provides a router for switching data packets from a source to a destination in a network in which the router includes a distributed memory. The distributed memory includes two or more memory banks. Each memory bank is used for storing uniform portions of a data packet received from a source and linking information for each data packet to allow for the extraction of the uniform portions of a data packet from distributed locations in memory in proper order after a routing determination has been made by the router.

Aspects of the invention include numerous features. The distributed memory includes an output queue for storing a notification indicative of the routing of the data packet through the router. The notification includes linking information for retrieving at least a first cell of the data packet from the distributed memory. The notification includes linking information for the first 5 cells of the data packet.

The notification includes an address for an indirect cell. The indirect cell is stored in the distributed memory and includes linking information for extracting cells in order from the distributed memory.

Each memory bank includes a global data area for storing portions of data packets and a notification area for storing notifications. The notification area is sized to be ⅕ of a size of the global data area for a given memory bank.

The router includes a plurality of multi-function multiports. Each multi-function multiport includes one or more input ports and output ports for receiving and transmitting data packets through the router. A portion of the distributed memory is located within each multi-function multiport such that each multi-function multiport includes a memory bank having a global data area and a notification area. The notification area of a given multi-function multiport stores notifications for data packets to be routed through an output port of the given multi-function multiport. Memory reads and writes to and from the distributed memory are sized to be 64 bytes.

The router includes a mapping means for mapping from a virtual address space to a physical address space associated with the distributed memory. The mapping means is used for detecting aged packets in memory and allowing for easy overwriting thereof such that garbage collection of aged packets is not required.

In another aspect, the invention provides a method of routing a data packet through a router in a system transmitting data packets between a source and a destination over a network including the router. The method includes receiving the data packet, dividing the data packet into a cells of a fixed size and storing the cells in a distributed memory. The distributed memory includes two or more memory banks. Consecutive cells from the data packet are stored in consecutive banks of the distributed memory. Linking information is stored in one bank of the memory for linking cells of the data packet that are stored throughout the distributed memory. The linking information is used for extracting the cells in order for transmission from the router to the destination.

In another aspect, the invention provides a method of storing a data packet in a router while a look-up engine determines the proper path through the router for the data packet in a system transmitting data packets between a source and a destination over a network including the router. The method includes dividing the data packet into fixed length cells and storing the cells and linking information for reconstructing the data packet across a global data buffer. The global data buffer includes two or more memory banks. The data packet is divided among the memory banks.

In another aspect the invention provides a method for determining which data packets stored in a router are to be passed through the router in a system transmitting data packets between a source and a destination over a network including the router. The method includes determining a route through the router for a data packet. The route includes a notification indicating a starting address in memory where the data packet is stored. The notification is processed including queuing the notification with other notifications to be output on the same output port of the router in a stream queue. The fullness of the stream queue is determined along with a drop criterion based in part on fullness of the stream queue. A random number is generated and compared with the drop criterion. The notification is dropped based upon results of the comparison.

Aspects of the invention include numerous features. The fullness test is performed when the data packet reaches a head of the stream queue. The fullness is a percentage and the random number generated is between zero and one.

Among the advantages of the invention are one or more of the following. A switch is provided that includes an efficient allocation of memory across ports and does not exhibit head-of-line blocking. The allocation enables all ports to share memory resources.

Memory bandwidth for the system may be tailored to meet specific user defined requirements. A switch is provided in which the amount of memory in the switch is proportional to system bandwidth where the constant of proportionality is the round-trip network delay.

Memory bandwidth is maintained at a minimum necessary level of approximately twice the throughput rate. Memory bandwidth may be advantageously expanded by the use of plug in modules.

A single system-wide virtual address space is provided that allows the memory to be read and written conveniently. An addressing scheme is provided that maps physical memory space (and its associated available memory modules) into a virtual space to simplify memory address computations and provide a mechanism for detecting if a notification (route) is pointing to cells that have been overwritten since the original data was written into memory.

Memory bandwidth for read and write operations is guaranteed for each port.

Other advantages and features will be apparent from the following description and claims.

BRIEF DESCRIPTION OF THE DRAWINGS

FIGS. 1a and 1b are block diagrams of conventional router devices.

FIG. 2a is a schematic block diagram of a data routing system according to one embodiment of the present invention.

FIG. 2b is a schematic block diagram of a router according to one embodiment of the present invention.

FIG. 3a is a schematic block diagram of an multi-function port according to one embodiment of the present invention.

FIG. 3b is a schematic block diagram indicating data transfers between components of the router of FIG. 2b according to one embodiment of the present invention.

FIG. 3c is a data structure for a cell transferred between a multi-function port and an input switch according to one embodiment of the present invention.

FIG. 4 is a schematic block diagram of a router including the timing and ordering of transfers from the input port to input switch according to one embodiment of the present invention.

FIG. 5a is a schematic block diagram of an input switch according to one embodiment of the present invention.

FIG. 5b is a schematic block diagram of a router including the timing and ordering of transfers from the input port to memory according to one embodiment of the present invention.

FIG. 6 is a data structure for a route request stored in a key buffer according to one embodiment of the present invention.

FIG. 7 is a data structure for an indirect cell according to one embodiment of the present invention.

FIG. 8 is a data structure for a cell transferred between the input switch and a memory bank according to one embodiment of the present invention.

FIG. 9 is a schematic block diagram of a reservation table according to one embodiment of the present invention.

FIG. 10 is a flow diagram of a process of loading a reservation table according to one embodiment of the present invention.

FIG. 11a is a schematic block diagram of main memory according to one embodiment of the present invention.

FIG. 11b is a schematic block diagram of a global data buffer according to one embodiment of the present invention.

FIG. 11c is a schematic block diagram of a router including 3 memory banks according to one embodiment of the present invention.

FIG. 11d is a schematic block diagram of a virtual address block for use in addressing memory according to one embodiment of the present invention.

FIG. 11e is a schematic block diagram of an index table for use in mapping physical address space to virtual address space according to one embodiment of the present invention.

FIG. 11f shows the relationship between physical and virtual addresses according to one embodiment of the present invention.

FIG. 11g is an example of a mapping between physical space and virtual space according to one embodiment of the present invention.

FIG. 11h shows the relationship between physical and virtual address space over time according to one embodiment of the present invention.

FIG. 12 is a schematic block diagram of a router including the timing and ordering of transfers from the input port to memory according to one embodiment of the present invention.

FIG. 13 is a schematic block diagram of a controller according to one embodiment of the present invention.

FIG. 14 is a data structure for an output request transferred from the controller to the output switch according to one embodiment of the present invention.

FIG. 15a is a schematic block diagram of an output switch according to one embodiment of the present invention.

FIG. 15b is data structure for a cell output from a memory bank to output switch according to one embodiment of the present invention.

FIG. 16 is a data structure for a cell transferred from the output switch to an output port in a multi-function multiport according to one embodiment of the present invention.

FIG. 17a is a schematic block diagram for an output section of a multi-function port according to one embodiment of the present invention.

FIG. 17b is a schematic block diagram for a queue system for storing notifications according to one embodiment of the present invention.

FIG. 18 is a flow diagram for a process of routing a packet through a router according to one embodiment of the present invention.

DETAILED DESCRIPTION

Referring to FIG. 2a, in a packet switching system, a source 10 is connected to one or more routers 20 for transmitting packets to one or more destinations 30. Each router includes a plurality of multi-function multiports that are connected to various sources and destinations. A packet from source 10 may pass through more than one router 20 prior to arriving at its destination.

Referring to FIG. 2b, each router 20 includes an input switch 100, an output switch 102, a global data buffer 104 including one or more memory banks 105, a controller 106 and a plurality of multi-function multiports 150 (150-0 through 150-3), respectively. Associated with the controller 106 is controller memory 109 for storing a routing table. Input switch 100 and output switch 102 are connected to each multi-function multiport 150 in router 20. In one embodiment, router 20 includes plug-and-play multi-function multiports which allows for easy expansion capability. The present invention will be described with reference to a system including eight multi-function multiports 150 (even though FIG. 2b only shows four, with each multi-function multiport including up to sixteen input ports and sixteen output ports. Other configurations may be used depending on user load conditions. Each multi-function multiport includes one or more input ports, one or more output ports and a memory. The configuration and operation of the multi-function multiports will be described in greater detail below.

In operation, packets are received at a multi-function multiport 150, transferred to input switch 100 and stored temporarily in global data buffer 104. When the packet is received by switch 100, a key is read from the first data block in the packet and transferred to controller 106. The key contains destination information which is derived from the header field associated with the first block of data in a packet and other information (such as source ID, priority data and flow ID).

A route look-up engine 110 in controller 106 performs a trie based search based on the key information and returns a result which includes the output multiport associated with the destination. The result is coupled with other information (such as source ID, flow ID and packet length) for routing the packet through router 20 and provided as a notification from controller 106 to output switch 102. Output switch 102 transfers the notification to the identified multi-function multiport 150. Upon receiving the notification information, the multi-function multiport 150 initiates the transfer of the packet from global data buffer 104 through output switch 102 to the appropriate multi-function multiport 150.

Multi-function Multiports

Referring to FIG. 3a, each multi-function multiport 150 includes an input section 270, an output section 280 and a memory section 290.

Input section 270 includes a line input interface 300, a data handler 302 and an input switch interface 304.

Output section 280 includes an output request processor 306, a line output interface 308, a storage device 310, stream output buffers 312 (one for each output stream), output formatter 314, an output switch interface 316 and head and tail queue buffer 318. In addition, the output section includes a portion of input switch interface 304. Specifically, input switch interface 304 includes read request queues 305, one for each memory bank. The use and operation of the read request queues, stream output buffers, and head and tail queue will be discussed in greater detail below in association with FIGS. 17a and 17b.

Memory section 290 includes a memory bank 105 (which represents a portion of the global data buffer 104) and a notification queue body 319. The use an operation of the memory section will be discussed in greater detail below in association with FIG. 17b.

The multi-function multiport is used in conjunction with the input switch, output switch and controller as is shown in FIG. 3b. The various piece components of the input section, output section and memory section will be described in greater detail below. The combination of the devices into a single unit simplifies the interfaces between the components.

Referring again to FIG. 3a, packets are received at line input interface 300. As the packets are received, data handler 302 divides the packets received into fixed lengths cells. In one embodiment, the length of each cell is 80 bytes, with 16 bytes of internal header (control information) and 64 bytes of cell data. As the data handler divides the incoming packets into fixed length cells, it synchronously outputs the cells to input switch 100 through input switch interface 304.

The format for transfers between the multi-function multiport and the input switch is shown in FIG. 3c. A cell 350 transferred from a multi-function multiport 150 to the input switch contains a cell header 352 and cell data 354. Cell header 352 includes a type field 356, stream field 358, and packet header fields 360. In addition, cell header 352 includes an independent read request in the form of a multi-function multiport identifier 366 and address 368.

The type field 356 indicates the type of cell to be transferred from the multi-function multiport. At each cell slot (20 clock cycles in one embodiment), a multi-function multiport may transfer either a data cell, an indirect cell placeholder, or a delayed indirect cell placeholder. Data cells contain data associated with an incoming packet. An indirect cell placeholder is an empty cell, and is used in conjunction with indirect addressing for the storage of the cells in the global data buffer 104. Delayed indirect cell placeholders arise when a data stream that requires indirect addressing terminates at a time prior to the designated time for writing the last indirect addressing cell associated with the data stream to global data buffer 104. The generation and operation of indirect placeholders and delayed indirect placeholders will be discussed in greater detail below in conjunction with FIG. 7.

Stream field 358 indicates the stream to which the cell data belongs. In one embodiment of the present invention, each multi-function multiport is capable of handling up to sixteen separate streams of data at a time, one on each of its respective 16 input ports.

Packet header field 360 contains header information associated with a given packet and includes start offset information, packet length and interface index information.

Multi-function multiport identifier 366 identifies the multi-function multiport which is sourcing the read request. Address 368 indicates the address in global data buffer 104 to be read.

Referring now to FIG. 4, a single cell 450 is transferred from a multi-function multiport 150 to input switch 100 at each cell (time) slot "T". For a given cell slot "T", input switch 100 receives a total of "N" cells, where "N" is equal to the number of multi-function multiports.

In one embodiment, cells from a given stream may be written to memory in an order that is different from the arrival order. These out of order writes are performed to make efficient use of scarce bandwidth between the multi-function multiports and the input switch. When a packet comes in to the multi-function multiport, it is broken up into cells as the bytes arrive and the cells are placed in per-bank output queues on the way to the input switch. These queues are designed to share scarce interconnect bandwidth between the streams of a multi-functional multiport in the most efficient way possible, but they have the detrimental effect of reordering cells at the interface between the multi-function multiport and the input switch. Thus the cells from a given stream may arrive at the input switch out of order. The multi-function multiport marks the data cells of a stream with one of four codes: first cell (FC); intermediate data cell (DC); last cell (LC); or first cell which happens to be also a last cell (FLC).

Input Switch

Referring to FIGS. 2b and 5a, input switch 100 includes a round robin data handler 500, one or more input interfaces (501-0 through 501-7, one for each multi-function multiport 150), one or more memory interfaces 502 (502-0 through 502-7, one associated with each memory bank), a like plurality of pointers 504 (504-0 through 504-7), an output processor 505, one or more output interfaces 506 (506-0 through 506-7, one for each multi-function multiport 150), a reservation table 508, an indirect cell processor 510, controller interface 512 and read controller 517.

a) Transfers through the Input Switch

Round robin data handler 500 receives cells from each multi-function multiport and transfers them to output processor 505 for output to an appropriate memory bank 105 in global data buffer 104. Round robin data handler 500 services the inputs (cells) received on input interfaces 501 in a round robin, time division multiplexed manner. That is, for a given cell slot, one cell from each multi-function multiport is received at the round robin data handler 500 and subsequently transferred to output processor 505 for transfer at the next cell slot to a memory bank 105 in global data buffer 104. At the next time cell slot, data handler 500 transfers the next cell received from the same multi-function multiport to output processor 505 for transfer to a different memory bank. In one embodiment, the next cell received is transferred to the next memory bank (next in numerical order, modulo N) in the memory array. Alternatively, another time dependent permutation may be used to control the transfer of successive cells from the same multi-function multiport.

Referring to FIG. 5b, the timing and ordering of transfers from the multi-function multiport to memory is shown. For the purposes of this example, a sequence of cells is depicted on each transmission line. For the purposes of this example only, each transmission line is considered to be very long and contains data associated with two or more cells. In operation, the transmission lines are short and multiple cells are not present on a transmission line at a given time. At cell slot T4 a series of cells 450-0 through 450-7 are transferred down transmission lines 458, one from each multi-function multiport 150 to input switch 100. At cell slot T3 (one just prior in time to cell slot T4) a series of cells 452-0 through 452-7 are transferred down transmission lines 458, one from each multi-function multiport 150 to input switch 100.

Round robin data handler 500 and output processor 505 within the input switch 100 transfer cells out to global data buffer 104 on transmission lines 460. As can be seen at cell slot T2, output processor 505 outputs one cell 454-$B_0$ to 454-$B_7$ to each memory bank in a single cell slot. The "$B_x$" designator indicates the multi-function multiport from which the particular cell was received. One cell from each multifunction multiport is written to global data buffer 104 per cell slot. At time period T1 (one cell slot prior to cell slot T2), again one cell (456-$B_0$ 456-$B_7$) is written to each memory bank. Round robin data handler 500 time division multiplexes the transfers to output processor 505 such that consecutive cells from the same multi-function multiport are written to consecutive memory banks 105 (modulo N) in global data buffer 104.

Referring again to FIG. 5a, pointer 504 indicates the location in an associated memory bank to which the next cell will be written. Output processor 505 writes a cell to a memory location in a particular memory bank based on the next available address in the bank as is indicated by the associated pointer 504.

b) Key Reading and the Linking Process

Round robin data handler 500 includes a key reading engine 514 for determining the key information associated with a first cell in a packet and a linking engine 515 for linking cells in the same packet.

The process of reading key information is known in the art. After the key is determined for a given packet, it is stored temporarily in key buffer 516 in input switch 100 until the entire packet has been stored in global data buffer 104. The data structure for entries 600 in the key buffer 516 is shown in FIG. 6. Each entry or "info cell" 600 includes a key 602, full address 604, offsets 606 and an indirect cell indicator 608.

Referring now to FIGS. 5a, 6 and 7, linking engine 515 determines the starting address (full address) in memory for where the first cell in a given packet is to be stored in memory. The starting address includes the bank number in global data buffer 104 (the bank number which is assigned to store the cell by round robin data handler 500) and the first available address location in the designated bank (as is indicated by the associated pointer 504). The starting address (full address 604) is stored in key buffer 516 along with the associated key 602 for the packet. When the next cell associated with the same packet arrives at switch 100, an offset 606 associated with the offset at which the cell is to be written (relative to the full address) is computed and stored in key buffer 516. In one embodiment of the present invention, up to four offsets 606 are stored. Each offset address is computed based on the relative offset in memory between the location of the last cell in memory and the value of the pointer 504 associated with the current memory bank which is to be written.

If more than five data cells are included in a packet, then the indirect cell indicator for that packet is set, and the last offset indicates the address in memory where the first indirect cell associated with the packet is stored. Indirect cells will be described in greater detail below in reference to FIG. 7. After the packet has been stored in memory, the associated info cell in key buffer 516 (a route look-up request) is forwarded through the controller interface 512 to the controller 106 for processing. Alternatively, the info cell may be transferred after the first five cells have been stored in memory.

The linking or threading of cells for a packet is performed by using the offsets described above and indirect cells. Offsets are used to link cells in a packet. Offsets may be stored along with key information and routed through controller 106 (FIG. 2b) or may be stored in indirect cells. In one embodiment, if a cell contains 5 cells or less, no indirect cells are required to be used. Indirect cell processor 510 performs the linking of cells in memory for a given packet. Indirect cell processor 510 generates indirect cells for storage in global data buffer 104. Indirect cells contain offset information associated with the relative offset in memory space between contiguous cells in the packet. Indirect cell processor includes indirect cell memory 520 for storing indirect cell data during the formation of indirect cells.

Referring now to FIG. 7, the data structure for an indirect cell 700 includes a linking field 702, a plurality of offset fields 704, and a last field 706. Linking field 702, when not set, indicates the current indirect cell is the last cell in the chain of indirect cells for a given packet. If set, then more indirect cells exist for the given packet. If more indirect cells exist, then last field 706 indicates the offset to the location in memory of the next indirect cell associated with the packet. In one embodiment, indirect cells contains up to 56 offset data blocks for linking 56 cells in memory.

As was described above, when a packet is received, the linking engine processes the first five cells and stores linking information in the form of a start address and four offsets in key buffer 516. In the event more than five cells are contained within a packet, the indirect cell processor takes over for the linking engine and computes the offsets associated with the locations in memory where the remaining cells in the packet are stored. Round robin processor 500 passes cells to the output processor 505 for transfer to an associated memory bank in global data buffer 104. Round robin processor 500 enables the indirect cell processor when the packet being processed contains more than 5 cells (based on header information included within the first cell). At the time for writing the fifth cell to memory, indirect cell processor 510 stores in indirect cell memory 520 the address (the "indirect cell address") associated with the location in memory at which the fifth cell would have been written if it had been the last cell in the packet. The indirect cell address indicates the location in memory where the indirect cell is to be written when full (or when the last cell of the packet is processed).

When an indirect cell is full (having stored offsets in all available locations except the last field 706), then the indirect cell processor stores the offset associated with the location in memory where the next indirect cell is located in the last field 706. Thereafter, the full indirect cell is written to its appropriate place in memory. The writing of the indirect cell to memory coincides with the receipt of an indirect cell placeholder by the input switch 100 from the associated multi-function multiport 150. This process continues until the last cell in a packet is stored in memory. At that time, the last indirect cell is written to memory, and the associated entry 600 from the key buffer 516 is transferred to the controller 106 for processing. For a given packet, all indirect cells are written to the same memory bank in the global memory buffer.

As often will be the case, the last cell of a packet will not coincide with the timing required to write the completed indirect cell immediately into memory. This is because packet length is completely arbitrary. The end of a packet will likely not coincide with the last available entry of an indirect cell. When a packet has completed (all cells have been received by the input switch) and a last entry in the indirect cell is written, the indirect cell is free to be written to memory. However, the writing will be delayed until the proper time, hence the term delayed indirect cell. A delayed indirect cell is a indirect cell that is the last indirect cell associated with a packet. It is delayed, because it is written to memory after the rest of the packet has been written to memory. The timing of the write to memory is dictated by the address which is reserved for the indirect cell. As was described above, at the time for the creation of an indirect cell, its position in memory is reserved. The delayed indirect cell will be written to memory at the next time slot available for the particular multi-function multiport to write to the particular memory bank after the packet has been completed. The timing of the write to memory of delayed indirect cells coincides with the receipt of a delayed indirect placeholder from the appropriate multi-function multiport 150.

c) Transfers to Memory

The data structure of a cell transferred from input switch 100 (via the output processor 505) to a memory bank 105 in global data buffer 104 is shown in FIG. 8. The unit of addressing and memory allocation is a 64-byte cell, and all accesses to memory are either cell reads or cell writes. A cell size of 64 bytes was chosen as a compromise between the conflicting requirements of bandwidth efficiency and storage efficiency. DRAM bandwidth efficiency dictates larger sizes, while storage loss caused by internal fragmentation when fitting variable size packets into fixed size cells dictates smaller sizes.

At each cell slot, output processor 505 generates a cell 800 which includes a read request source field 802, read address 804, write address 806 and data field (cell data received from multiport 150) 808. The read request source field 802 indicates the output port (in the particular multi-function multiport 150) requesting the read (destination output port). Output processor 505 receives read requests from read controller 517 and bundles the read request with any write request received from round robin data handler 500 destined for the same memory bank. At each cell slot, output processor 505 provides a cell 800 which may include a write and read request to each memory bank 105 in global data buffer 104.

Read controller 517 controls the transfer of read request signals flowing from input switch 100 out memory interface 502 to the individual memory banks in global data buffer 104. Read controller 517 receives read requests from each multi-function multiport through output interfaces 506. The format of each request includes source identification (output port) and a full address in memory which is to be read. At each cell slot, each multifunction multiport port may generate a read request for processing by switch 100 to read a memory location in global data buffer 104, resulting in the reading of a cell (a read reply) from a memory bank 105 (on a subsequent cell slot) to output switch 102.

Read controller 517 loads a reservation table 508 as requests to transfer packets are received from the various multi-function multiports 150. The reservation table is loaded such that at every cell slot a single read request is generated for each bank of memory 105. Referring now to FIG. 9, reservation table 508 includes a plurality of columns 900, one for each memory bank 105 in global data buffer 104, a plurality of rows 902, placeholders 904 and loaded entries 906. Each row represents a set of read requests (one per memory bank) to be generated on a single cell slot. Each row includes a single entry for each multi-function multiport 150. At each cell slot, each multi-function multiport is capable of requesting a read from a single memory bank 105 in global data buffer 104. Associated with reservation table 508 is a read pointer 908. The pointer points to the next row in the reservation table to be read. Rows ahead of the read pointer correspond to requests that will be queued at a later cell slot time. In one embodiment, the pointer moves at least one row in each cell slot time.

Loaded entries 906 reflect read requests to be performed as a result of reservation requests received from individual multi-function multiports. Placeholders 904 represent available slots in which read requests for a particular memory bank are still available (e.g., read requests which have not as of yet been received for this memory bank from a particular multi-function multiport). At each cell slot, the read controller 517 performs three functions: loading entries in the reservation table at the first available location in the table (after the read pointer), outputting the last row as read requests to the output processor 505; and refreshing the table, moving out the last row, incrementing the rows and creating a new row at the top of the table. The number of rows in the reservation table must be as large as the product of the latency in processing read requests multiplied by the number of banks. In one embodiment, 48 rows are included in reservation table 508 reflecting a system including six cell slots of latency and eight memory banks.

At initialization, reservation table 508 contains placeholders 904 in all of the rows 902. Placeholders 904 are locations in the reservation table which have not been loaded. As read requests are processed by the read processor, certain ones of the placeholders 904 are converted to loaded entries 906 based on the read requests. Loaded entries 906 include a read request address.

Referring now to FIG. 10, the process of loading the reservation table includes receiving a read request (full address) from an multi-function multiport (1000). The read controller decodes the read request to determine the column (based on the memory bank to be read from) in the reservation table to search (1002). The read processor searches, starting at the location indicated by pointer 908 in the reservation table, for the first placeholder associated with the multi-function multiport that generated the read request (1004). The read processor transforms the placeholder 904 to a loaded entry 906 by writing the full address of the read request at the location (1006). The process repeats for each read request received by the read controller (1008).

Memory Architecture

Referring now to FIGS. 11a–c, main memory 1050 is used as temporary buffer storage for packets flowing into the system on input streams 1052 and out of the system on output streams 1054. Main memory is divided into two distinct parts: a global data buffer 104 that is used to store incoming packets while the lookup engine determines the outgoing stream for each packet; and packet notification queues 319 that are used to store packet pointers (notifications) after the outgoing stream has been determined. Notification queues 319 are associated with outgoing streams, whereas the global data buffer 104 forms a common pool shared amongst all the streams.

Global data buffer 104 includes a plurality of memory banks 105. Associated with each memory bank is an input switch interface (an input port) 304 and output switch interface (an output port) 316. At each cell slot, each memory bank receives at most one write and one read request via input switch interface 304. The write requests are associated with cells received from a multi-function multiport 150. Read requests reflect a request for cell data to be transferred from a memory bank 105 to output switch 102 for ultimate transfer to a requesting multi-function multiport 150.

The memory in the multi-function multiport configuration is physically distributed across a number of banks b, one bank for each active multi-function multiport in the system. FIG. 11c show a system including three banks, numbered 0, 1 and 4 respectively, representative of three active multi-function multiports. Each bank is divided into two contiguous, non-overlapping regions referred to as global data area (memory bank 105) and the notification area (notification queue 319). The global data area for a bank constitutes 1/b of the memory of the global data buffer 104. The notification area provides space for queuing notifications that will be sent out on the line output interface 308 for a given multi-function multiport. Typically, the global data area is four times larger than the notification area; this factor derives from the ratio between data size and notification size for the shortest packet.

Each bank's memory bandwidth is sufficient for reading and writing packets from a full-duplex OC-48 interface as well as for queuing and dequeuing notifications for the worst-case example of single-cell packets. Thus, both the aggregate memory size and the aggregate memory bandwidth scale linearly with the number of active multi-function multiports b in the system.

In one embodiment, each memory bank is implemented as two sub-banks using two 72-bit wide SDRAM (static dynamic random access memory) DIMM's (dynamic in-line memory modules) cycling at 125 MHZ . The sub-banks are transparent to the input and output switch resulting in what appears to be one continuous bank from the perspective of the switches. However, the sub-bank architecture allows for better throughput. Each DIMM has a 72-bit wide ECC (error correction code) protected data path going to 9 SDRAM chips each of which is 8 bits wide. The two DIMM's have separate address busses and are addressed independently of one another. The DIMM's are interleaved on bit 0 of the 23-bit address. In one embodiment, the smallest memory bank configuration is 32 MBytes, using 16 Mbit chips and the largest is 512 MBytes, using 256 Mbit chips.

As was described above, a bank can receive at most one read request and one write request every cell slot. Since a cell slot is 20 clock cycles at 125 MHZ, this works out to a peak bandwidth demand of 400 MBytes/sec for reads and 400 MBytes/sec for writes. The worst case notification load occurs for single cell packets. For unicast traffic, this load is exactly ¼ the data bandwidth which works out to 100 MBytes/sec for reads and 100 MBytes/sec for writes. In this embodiment, the total peak memory bandwidth needed is therefore 1 GByte/sec.

In this embodiment, the peak transfer rate of each DIMM is 1 GByte/sec, but the sustained rate depends on the actual mix of reads and writes and how the addresses are distributed over the internal DIMM banks. In practice, each DIMM is expected to deliver a sustained data rate of around 650 MBytes/sec. The total of 1.3 GBytes/sec supplied by the two groups is 30% larger than the maximum sustained requirement of 1 GByte/sec/. The 30% headroom provides a way to sustain instantaneous loads where one DIMM has more references directed to it than the other. The memory controller for the two DIMM's resides in the multi-function multiport.

In one embodiment, all banks are made the same size and approximately ⅕th of the memory in each bank is allocated to the notification area and ⅘th to the global data area. The purpose of this allocation is to make it exceedingly unlikely for a stream to run out of memory because of space in its notification queue. With a worst case packet size of 64 bytes, notifications (sized at 16 bytes) need ¼ th the amount of storage that packet data needs, which is exactly the proportion allocated. Any cell in the global data buffer may be accessed via its physical cell pointer, which identifies the physical bank number and the address of the cell within the bank. The physical cell pointer defines a system-wide physical address space. To simplify address computations, as well as to provide a mechanism to detect old packets, accesses to the global packet buffer are performed through a system-wide virtual address space that maps to the physical address space.

Incoming packets are broken up into as many cells as needed and the cells are written to the global packet data buffer as they arrive as described above. The global data buffer is treated as a single large circular buffer. The input switch maintains an array of write pointers, one per active bank, to keep track of where to write the next cell. The pointers start out at one end of the buffer and advance until they eventually wrap around and overwrite packets that were written a long time ago. An ageing mechanism is used to guard against reading cells that may have been overwritten by subsequent packets. The cells of packets arriving on a given stream are interleaved strictly across the active banks to spread the bandwidth load.

a) Addressing

Global data buffer 104 is divided into banks which are in turn divided into fixed size, non-overlapping 64-byte units called cells. The cell is both the unit of addressing and of memory allocation. All accesses to memory are performed using two operations: cell read and cell write. Since there is only one access size, memory allocation is straightforward and there are no issues of data alignment or byte order.

Each cell in the system is uniquely identified by a physical cell pointer or PCP, which identifies the cell's physical bank number and address within that bank. The set of PCP's form a system-wide physical address space that can be used to read or write any cell in the system. While this space provides access to all possible banks in main memory, it is not convenient for reading and writing cells that are part of the global data buffer.

For example, physical space may have holes in it corresponding to memory banks (multi-function multiports) that are either not plugged in or are plugged in but inactive.

In addition, the size of the global data area is not necessarily a power of two (since an odd number of multi-function multiports may be available and because of the ⅘ to ⅕ ratios set forth for the global area and notification areas respectively), so address computations involve checks that would normally not be needed. Both these factors make the address arithmetic that needs to be performed on each access awkward, and using physical space directly forces each entity issuing reads and writes to know how to do this arithmetic. Finally, direct access to physical space provides no mechanism for detecting if a notification is pointing to cells that have been overwritten since the original data was written to memory. A virtual-to-real address mapping mechanism provides a way to solve these problems. This mechanism defines a single system-wide virtual address space that allows the global packet buffer to be read and written conveniently. All non-diagnostic accesses to the buffer use this address space.

b) Physical Space

Each memory bank has a unique 3-bit physical bank number, or PBN, that is equal to the number of the slot in which the bank is plugged. In one embodiment, slots are numbered sequentially from 0 to 7 (assuming an eight multi-function multiport configuration). Note that a bank may be plugged into any available slot so that the set of active bank numbers in a system can be an arbitrary subset of the numbers [0 . . . 7]. The PBN serves as the physical address of a bank.

Within a bank, cells are identified using a 23-bit physical cell address, or PCA (1124 of FIG. 11*f*). Cells are numbered sequentially starting at 0 and ending at $N_{bank}-1$, where $N_{bank}$ is the number of cells in the bank. In one embodiment, the maximum amount of memory in a bank is limited by the architecture to $2^{23}$ cells, or 512 MBytes.

A bank's memory is divided into two contiguous non-overlapping regions: cells [0. . . $N_{buf-1}$] are allocated to the global packet buffer, while cells [$N_{buf}$ . . . $N_{bank}$] are allocated to queues that hold notifications for packets to be sent out via the associated multi-function multiport. The number of cells $N_{buf}$ allocated to the global data buffer is the same for each of the b active banks so each bank contributes exactly $1/b^{th}$ of the storage for the buffer. Typically, around ⅕th of the memory in a bank is allocated for notification queues and ⅘th for the global data buffer.

Although each bank is shown to be the same size, note that only the global packet buffer areas are required to be the same size across banks. The architecture places no such restriction on the size of the notification areas even though they will typically be the same size.

Any cell in the system is identified uniquely by the 26-bit tuple <PCA><PBN>. This tuple is called the cell's physical cell pointer, or PCP. The set of possible PCP values defines a system-wide physical address space. All cell references must be translated to a PCP before the cell can be read or written. In one embodiment, the maximum amount of memory in the system is limited by the architecture to $2^{26}$ cells, or 4 GBytes.

c) Virtual Space

Referring now to FIG. 11*d*, there is a single, system-wide virtual address space that allows the global data buffer to be read and written conveniently and also allows for the easy detection of aged packets in memory. By providing a mapping from virtual to physical address space maintenance of memory is simplified and no garbage collection of aged packets is required. The virtual space is defined by the set of possible values for a 27-bit quantity called the virtual cell pointer, or VCP (1120). The VCP consists of a 24-bit virtual cell address, or VCA (1122), concatenated with a 3-bit virtual bank number, or VBN as shown in the figure 11c.

The set of values for VBN define a virtual bank number space that make it convenient to do arithmetic on bank numbers. If there are b active banks in the system, the legal values of VBN are [0 . . . b−1], and all arithmetic on VBN's is done mod b.

The set of values for VCA define a virtual cell address space for the bank identified by VBN. This virtual cell address space makes it convenient to do arithmetic on cell addresses that lie in its bank and also enable ageing checks.

A VCP is translated to a physical cell pointer (PCP), by performing two separate mappings: first, the VBN is mapped to a physical bank number (PBN) and then the VCA is mapped to a physical cell address (PCA). The two mappings are not independent. In particular, the VCA to PCA mapping uses states particular to the physical bank produced by the first mapping.

d) Bank Number Mapping

Virtual bank numbers are translated to physical bank numbers by the input switch using an 8-entry lookup table 1150 as shown in FIG. 11e. The table is indexed by a 3-bit VBN and produces a 3-bit PBN as the result. The table The example shows the table for a system that has five active multi-function multiports plugged into slots 2, 3, 4, 6, and 7.

In general, if there are b active banks in the system, the first b entries of the table are filled with the physical bank numbers for these banks.

e) Cell Address Mapping

Referring now to FIG. 11f, virtual cell addresses are also translated to physical cell addresses by the input switch. As mentioned earlier, VCA to PCA translation is always done in the context of a particular physical bank which, by definition, must be active.

For purposes of simplifying mapping, the virtual and physical cell address spaces are broken up into contiguous, self-aligned, 4096 cell regions called pages. The low-order 12 bits of both VPA's and VCA's correspond to the address of a cell within a page, while the high-order bits correspond to the address of the page itself. Referring now to FIG. 1ie, the mapping process preserves the low-order bits of the address while mapping the high order bits.

The operation of the $VP_{Map}$ (1130) function is as follows: Let N be the number of pages contributed to the global packet data buffer by each bank. From the structure of VCA's, it is clear that this number must be an integer in the range [1 . . . 2048] (The value 0 is excluded because it represents the case of no buffer memory). Note that the number of pages in virtual space is exactly two times the largest value of N. As will be seen later, this fact is crucial for the ageing scheme to work.

The $VP_{Map}$ function is time-dependent, but its operation at a given time is straightforward. For each bank this function maps a contiguous region of N pages in virtual space $[V_{TP}, V_{TP}+1, \ldots, V_{LP}]$ onto the N pages of physical space for that bank (where TP stands for "trailing page" and LP for "leading page"). All regions are located at the same point in their respective spaces at a given time. For this discussion, all arithmetic is mod 4096, so virtual address space is assumed to wrap around after page 4095. One of the virtual pages in the region is always mapped to physical page 0. Let this page be $v_0=v_{TP}+k$. Then, virtual pages $[v_{TP}+k, v_{TP}+k+1, \ldots, V_{LP}]$ are mapped directly to physical pages [0, 1, . . . , N−k−1], and virtual pages $[V_{TP}, V_{TP}+1, \ldots, V_{LP}+k-1]$ are mapped directly to physical pages [N−k−1, N−k, . . . , N−1]. That is, the N page region is broken into two disjoint pieces and pages in the two pieces are mapped one-for-one to identically sized pieces of physical space. References to virtual pages that lie outside the region are mapped to physical page 0×FFF to indicate that the reference was to a cell that has been overwritten. FIG. 11g shows this mapping for a simple example where N=9, and k=3.

The time-dependent behavior of $VP_{MAP}$ is that the N page region of virtual space that is mapped moves with time. At system initialization $V_{LP}$ is set to 0, and $V_{TP}$ is set to −(N−1). As cells are written to system memory, the write pointers for each bank advance more or less together but they do not move in lock-step. The system computes $V_{LP}$ as the high-order page bits of the bank write pointer that is furthest ahead; $V_{TP}$ then is simply $(V_{LP}-N+1)$. FIG. 11h shows how the region moves with time. The virtual address space is shown as a circular buffer with page numbers marked on the outside, and the mapped region is shown highlighted. The leftmost picture shows the mapping at initialization time, while the next two show the mapping at progressively later times.

As the region advances, the value of $v_0$ must be updated periodically so it stays in the range of virtual addresses that is being mapped. At system initialization $v_0$ is set to 0, and subsequently each time $v_0$ becomes equal to $V_{TP}$, it is incremented by N. The increment is done after mapping, not before.

reset: $v_0=v_{LP}=0$;

if ($v_0=v_{TP}$)

$v_0=v_0+N$ f) Transfers from the Input Switch to Memory

Referring now to FIG. 12, the transfer of cells from the input switch 100 to global data buffer 104 is performed in a time division multiplex fashion. That is, consecutive cells from a given multiport are directed to different memory destination locations. At each time period (cell slot), the input switch transfers to memory a single cell received from each multi-function multiport (as available) into memory. At a next time T+1 the input switch transfers again a single cell from each multiport into memory. Successive entries from the same input multiport are written to different memory banks 105 in global data buffer 104.

Controller

Referring now to FIG. 13, controller 106 includes controller memory 109, route look-up engine 110, input switch interface 1300, and output switch interface 1302. Controller 106 receives a route look-up request from input switch 100 at the input switch interface 1300. In one embodiment of the present invention a plurality of route look-up engines 110 are included in controller 106, each receiving look-up requests in round-robin fashion so as to speed the routing process. In one embodiment, controller memory 109 is a four-bank static random access memory (SRAM) that requires thirty two route look-up engines 110 to service at full bandwidth. The matching of keys retrieved from a packet in order to determine a best match route through the router is described in greater detail in co-pending patent application entitled "HIGH SPEED VARIABLE LENGTH BEST MATCH LOOK-UP IN A SWITCHING DEVICE", filed on Dec. 16, 1996, by Fergusen et al., Ser. No. 08/767, 576, which is hereby expressly incorporated by reference.

The route look-up engine servicing the route look-up request performs a best match look-up and outputs a notification through output switch interface 1302 to output switch 102. The notification includes a result which indicates the multi-function multiport to be used in the transfer of the packet to its destination.

Referring now to FIG. 14, the data structure associated with the notification outputted by the controller 106 to the output switch 102 is shown. Th data structure 1400 for the notification includes a mask 1402, a next hop index pointer 1404, full address 1406, offsets 1408 and packet length 1410.

The mask field 1402 is used to indicate which multi-function multiport connected to output switch 102 is to transfer the packet. In one embodiment, the notification may be sent to more than one multi-function multiport resulting in the broadcast of the associated packet.

Associated with each multi-function multiport 150 is a storage 310. The next hop index pointer points to a location in storage 310. Storage 310 is used to store media header information associated with a particular type of packet transfer. Next hop addresses, media headers and storage 310 will be described in greater detail below in association with the output section of multi-function multiport 150.

The full address 1406 indicates the starting address in the global data buffer where the first cell in the packet is stored. As was described above, offsets 1408 provide linking information for retrieving cells or an indirect cell associated with the packet. Packet length filed 1410 indicates the length of the associated packet and may be used to determine if indirect cells will have to be retrieved.

Output Switch

Referring now to FIG. 15*a*, output switch 102 includes a controller interface 1500, one or more memory inputs 1502 (1502-0 through 1502-7, one for each memory bank), one or more outputs 1504 (1504-0 through 1504-7, one for each multi-function multiport), a result processor 1506 and an output processor 1508. Output switch 102 performs four functions: receive output results, process output results, receive cells from memory and output cells to output ports.

a) Transfers from Memory to the Output Switch

Cells from memory are received at memory inputs 1502 and transferred to output processor 1508. Cells are transferred based on read requests received at the input switch from multi-function multiports. The data structure associated with the cells transferred from global data buffer 104 to output switch 102 is shown in FIG. 15*b*. Each cell 1510 includes an output port identifier 1512 and cell data 1514.

Output processor 1508 decodes the destination multi-function multiport from the cell information received from memory and transfers the cell data to the appropriate outputs 1502. At each cell slot, output switch 102 may receive a cell for processing from each bank in global data buffer 104.

b) Transfers from the Output Switch to the Multi-function Multiports

Output switch 102 receives notification from controller 106 on controller interface 1500. Result processor 1506 decodes the result (route) and determines which multi-function multiport(s) 150 is (are) to receive the route data. Based on mask 1402 in the notification, result processor 1506 transfers the notification to output processor 1508 for transfer to each multi-function multiport 150 indicated. At each cell slot, output processor 1508 provides (via outputs 1504) a route to each multi-function multiport 150.

The data structure associated with the data transferred from output processor 1508 to multi-function multiports 150 is shown in FIG. 16. A cell 1600 includes a header 1602 and data field 1604. The header 1602 includes memory bank source information 1606 and route information 1608. The memory bank source information includes a source identifier for indicating which memory bank provided the cell in data field 1604. Route information 1608 contains data from the notification including a next hop index, packet length, full address and offsets.

Output Section of a Multi-function Multiport

Referring now to FIGS. 17*a* and 17*b* each multi-function multiport 150 includes an output switch interface 316, an input switch interface 304 including read request queues 305, head and tail queue buffer 318, an output request processor 306, an line output interface 308, storage device (memory) 310, stream output buffers 312 and output formatter 314.

a) Notification Queues

A multi-function multiport 150 receives notification that a packet is to be processed in the form of a notification cell 1600 (FIG. 16) received at the output switch interface 316.

Output request processor 306 processes notifications, storing each in an appropriate location in head and tail queue buffer 318 and servicing notification requests as they make their way through the various priority queues in head and tail queue buffer 318. The servicing of requests results in the generation of a read request to input switch 100 associated with the first address in memory where the packet (associated with the particular notification) is stored.

Referring now to FIG. 17*b*, head and tail queue buffer 319 includes a plurality of notification queues Q 1700, where Q=4*s, and where s is the number of active streams in the multi-function multiport. Unlike the global data buffer, the queues Q are implemented on a per-port basis. The queues in a respective multi-function multiport store only those notifications associated with streams to be outputted from the respective port of the multi-function multiport. Each queue is itself divided into a head region 1702, a tail region 1704 and a body region 1706. The head and tail region for a queue are stored in the head and tail queue buffer 318.

The size of the portion of the head and tail queue buffer dedicated to each stream is fixed at initialization time and is proportional to the peak bandwidth of its stream. The partitions between portions are "hard" in the sense that a stream cannot use more than the memory allocated to it. The partitions between queues associated with the same stream are "soft". The size of an individual queue is proportional to the nominal bandwidth allocated to its queue. The body region of the notification queue is stored in the notification area 319 (FIG. 3*a*) of the memory section 290 of the multi-function multiport 150. Each stream is assigned 4 queues (the body portions of the priority queues) in the notification area 319 (FIG. 3*a*). The body region is sized to be ⅕ of the overall memory section.

Each queue associated with a given stream is serviced according to a priority scheme. Notifications that are received by the output request processor 306 are loaded into an appropriate queue associated with a stream based on the priority of the notification. Priority for notifications can be set by an external source and may be included in the packet received by the router. Alternatively, controller 106 (FIG. 3*a*) may set the priority depending on the amount of time required to perform the route look-up or other criteria.

Once a queue 1700 has been identified based on the priority information and stream ID, the output request processor 306 loads the notification into the appropriate tail queue 1704. Notifications are transferred between the respective head, tail and body portions of a queue based on available space by a queue manager (not shown). In one embodiment, each notification is 16 bytes, and the notification area 319 is sized to hold 64 bytes. Accordingly, for reasons of bandwidth efficiency, all reads and writes to the notification area are done using 64-byte cells containing four 16-byte notifications each.

The head and tail of each queue is sized to store only a small number of notifications, the bulk of queue storage being provided by the notification area in the multi-function multiport memory bank. As long as space is available on-chip (on the multiport) to hold the notifications for a queue, the notification area is completely bypassed. When on-chip space runs out, the notification area acts as the large "middle" of the queue, with a few notifications at the head and tail being held on-chip.

While the size of the notification area will tend to limit the numbers of dropped packets, occasionally a queue will become full. Output request processor includes a drop engine (not shown) for determining which entries in a particular queue are to be dropped based on a predefined algorithm. In one embodiment, the drop engine institutes a programmable random early drop routine. The routine is programmable in that the user can define one or more parameters, random in that a random number generator is used to determine whether a entry will be dropped. Early refers dropping from the head of the queue.

The programmable random early drop routine may be implemented in software and when executed performs the following sequence of operations. The process begins by calculating the amount of data stored in a particular queue. This information is stored in the form of a fraction (or percentage) of fullness. Thereafter, a drop criterion is determined based on the fraction of fullness. In one embodiment, a table of drop criterion values ranging from zero to one is mapped against fullness fractional values. The drop engine then derives a random number from zero to one. The random number may be generated by a random number generator or other means as is known in the art. A comparison is made between the random number generated and the drop criterion value. Thereafter, the entry at the head of the particular queue is dropped if the random number generated is larger than the drop criterion. Alternatively, the drop engine could avoid the drop if the random number generated is less than the drop criterion. The drop engine operates on each queue at a regular interval to assure that the queues do not overflow and a orderly method of dropping packets is achieved if required. This process is extremely helpful when transmitting packets across the Internet.

b) Per Bank Notification Queues

Each stream includes four queues 1700 that are serviced using a weighted round robin discipline. The weighting is used to reflect the priority associated with a given queue. For example, the four queues for a given stream may be serviced in the following ratios: Q1 at 50%, Q2 at 25%, Q3 at 15% and Q4 at 10%.

The multi-function multiport maintains four cell pointers for each queue: start, end, head, and tail. In one embodiment, each pointer is 23 bits long and can address the entire memory associated with the multi-function multiport. The start and end pointers mark the boundaries of the queue's region, while the head and tail pointers point to the next cell (notification) to read and next cell o write respectively. The head and tail pointers are restricted to align within the region defined by the start and end pointers, and standard wrap-around arithmetic is performed when incrementing these pointers.

Given the description above, it should be clear that the region for a queue can be as small as one cell and as large as the entire memory bank. It is up to the software to configure the pointers at initialization time to define the sizes of the regions, and to ensure that regions are non-overlapping with each other and with the memory allocated to the global packet buffer.

Typically, the software is used to allocate memory to a stream proportional to the stream's bandwidth.

C) Read Request Generation

Output request processor 306 services the queues to extract notifications from the head regions of queues 1700. Output request processor generates a first read request based on the full address received from output switch 102. Thereafter subsequent read requests are generated for transmission to the input switch based on the offset information provided in the request (from cell 1600) or indirect cells (as will be described below). Read requests include a stream identifier and a full address. Read requests are sent by the output request processor to an appropriate read request queue 305. One read request queue 305 is provided for each bank of memory.

If the packet length, as determined from the route information provided with the cell 1600, is greater than five (5) cells, then the output request processor first requests the transfer (read from memory) of the first indirect cell associated with the packet. This is accomplished by computing the address of the indirect cell based on the full address and the offsets provided in cell 1600. After the indirect cell request is generated, the output request processor generates read requests for the remaining cells in the packet based on the full address and the offsets provided in cell 1600. Upon receipt of a indirect cell from the output switch 102, output request processor continues to generate read requests for the remaining cells in the packet based on the offset information contained within the indirect cell.

Subsequent indirect cells are retrieved in a similar fashion. That is, at the time for reading the next indirect cell, the address of the next indirect cell is computed based on the last offset stored in the previous indirect cell. The timing of retrieving the indirect cells is accomplished such that no delays in the output stream are incurred. Each subsequent indirect cell is retrieved prior to the end of the processing of the prior indirect cell. In this way, once the output stream is initialized, no buffering of data is required and no interruptions due to the latency associated with the retrieval process are experienced.

Output requests to an individual memory bank are processed strictly in order. That is, the multi-function multiport may track each request issued to a memory bank (through the read request queues) and is assured that the data received in response to a series of requests to the same memory bank will be strictly delivered according to the sequence or pattern in which they were issued. Output request processor 306 keeps track of requests generated for each memory bank through the use of reply queues (not shown). The request queue contains a stream number and a read address. When a request is issued to memory, the entry is removed from the request queue and the stream number portion is placed in an associated reply queue. When a reply is received, the entry at the head of the reply queue is removed and the reply is sent to the stream number (in stream output buffer 312) indicated by the stream number retrieved from the reply queue.

As cells are received back at the multi-function multiport 150 (responsive to the read requests), they are stored in an associated stream output buffer 312. Stream output buffer 312 includes a plurality of FIFOs, one for each stream. Each cell received for a stream is placed in the streams associated FIFO. For given packet, the multi-function multiport stores a fixed number of cells (in the FIFO) required to provide a streamed output prior to initializing the output of the stream to line output interface 308. In one embodiment of the present invention, twelve cells are stored prior to beginning output (stream data) from the output port. The selection of the number of cells for storage in output buffer 312 is based on the latency in the read process (number of clock cycles between a read request from an multi-function multiport and the arrival of the cell associated with the read request to the output port).

Output formatter 314 receives the cells from output buffer 312 and couples the data with media header information stored in memory 310. Each request (notification) received from output switch 102 includes a next hop index. The next hop index indicates the starting address in memory 310 of the media header information associated with a given type of transmission (derived from the destination of the packet). Media header information stored in memory 310 may be loaded upon initialization of the router and updated by the controller as required. Output formatter 314 couples the cell data returned from memory with the appropriate media header to generate a proper packet for transfer out of router 20 on the line output interface 308.

Packet Routing Overview

Referring now to FIG. 18, in a method of routing packets through a switch a packet is received at a multi-function multiport (1800). The multi-function multiport divides the packet into fixed length cells and transfers the cells to an input switch (1802). Input switch removes the key information from the first cell in a packet and stores it temporarily in a key buffer (1804). Thereafter the input switch routes the cells to memory banks resident in the multi-function multiports in a time division multiplexed manner (1806). The input switch stores the first address in memory where the first cell is stored and computes offsets for each additional cell associated with the offset in memory for the next contiguous memory bank into which the next cell is written (1808). The input switch creates indirect cells to store linking information for the packet if the packet length exceeds five cells (1810). If the number of cells exceeds the number of available offsets in an indirect cell, then the old indirect cell is stored in memory and a new indirect cell is created and loaded based on the offsets calculated for each new cell received at the input switch.

When the packet (and its indirect cells if any) have been stored in memory, then the key, full address of the first cell and offset information is transferred as a look-up request to a controller (1814). The controller performs a best match look-up and generates a result of the look-up. The result includes the destination port (multi-function multiport), address, offset information and next hop index (1816). A notification including the result is transferred to the output switch for transfer to the appropriate multi-function multiport (1818).

Upon receipt of a notification, the multi-function multiport generates read requests a cell at a time to the input switch for the data associated with the packet (1820). The input switch issues the read requests in a time division multiplexed fashion generating a single request to each memory bank per cell slot (1822). When the memory bank receives the request from the input switch, cell data and a multi-function multiport identifier associated with the request are transferred to the output switch (1824). Again, at each cell slot, the output switch transfers a single cell to each of the multi-function multiports. Upon receipt, the multi-function multiport couples the cell data with media header information and streams the data to the destination (1826).

System-Level View

Up to S streams, where S=s*b+1, may be in process in the system concurrently for b active banks (+1 is for the stream corresponding to the control channel (the control channel stream is used to control configuration and operation of elements in the router). Each stream consists of a sequence of packets of arbitrary length L with arbitrary inter-packet gaps. In one embodiment L is less than 64 KBytes. A stream operates at a constant rate R Bytes/sec when it is receiving a packet, and a rate of 0 Bytes/sec when it is not. Thus, there are no "holes" during the reception of a packet. The value R for a stream is determined at system initialization time and Rmin and Rmax are system constants defined at design time. In one embodiment, Rmin is approximately 4 MBytes/sec and Rmax is approximately 320 MBytes/sec.

As described earlier, each packet is divided up into 64-byte cells before being written to memory. If all packets are long compared to 64 bytes, then the rate of cells generated by a stream is simply R/64 or 0 depending on whether a packet is being received or not. Unfortunately, because real life packets do not satisfy this assumption, the instantaneous rate of cell generation depends on the lengths of the packets being received, and this rate will typically be larger than R/64 because of unoccupied bytes in cells. Because of this dependency, the most we can say is that a stream is either generating cells at some rate between R/64 and a small factor f times this rate, or it is not. The worst-case value of f for IP is 128/65, which occurs for 65 Byte packets where one cell is full and the other carries a single byte. For realistic network traffic, however, the average value of f should be around 1.2, with bursts of 40 Byte packets causing f to go as high as 1.6 for short periods.

Let the cells generated by a given stream be numbered I, I+1, I+2, . . . etc. As was described above, cells are written to sequentially increasing bank numbers I mod b. The virtual address to which a particular cell is written is determined largely by the cell's arrival time into the system. For each active memory bank, the system maintains a write pointer that determines where the next cell directed to that bank will be written. The pointers are kept in the input switch, and so is the logic to switch incoming cells to the appropriate bank. When the input switch receives a cell, it knows which bank the cell should be written to by the cell's ordinal number. The input switch looks up the write pointer for the destination bank, writes the cell, and then increments the bank pointer to point to the next location.

At system initialization, all bank pointers in the input switch are set to 0, and the S streams in the system are initialized with starting bank numbers such that approximately the same number of streams are pointed to each of the b active banks. Although the starting bank numbers are distributed evenly, they do not have to be. Distributing them evenly simply makes the magnitude of the maximum negative offset a little smaller. FIG. 19 shows the starting configuration for a system with b=8.

Over time, the bank pointers move as cells are written to the buffer, but they move in a compact group because each stream writes its packets to sequentially increasing bank numbers mod b. The overall speed of the group is determined by the sums of the instantaneous bandwidths on all the streams, and can vary from 0 cells/sec when no packets are being received to a maximum of 400/64=6.25M cells/sec when all interfaces are running at peak capacity.

ALTERNATIVE EMBODIMENTS

In an alternative embodiment, multi-function multiport 150 may be divided into separate functional blocks and embodied in separate physical structures. For example, each multi-function multiport may be separated into an input port, an output port and a memory. Memory may include both the global data buffer and the notification queues. Alternatively, memory may be divided further with the notification queues physically manifested as a part of an output port.

The present invention has been described in terms of specific embodiments, which are illustrative of the invention and not to be construed as limiting. Other embodiments are within the scope of the following claims.

What is claimed is:

1. A router for switching a data packet from a source to a destination in a network, the router comprising:

an input port for receiving the data packet, the data packet formatted in accordance with a first protocol;

a divider for dividing the data packet into uniform length cells for temporary storage in the router, the divider dividing the data packet without changing the formatting of the data packet;

a distributed memory comprising a plurality of physically separated memory banks, each memory bank including a global data area for storing a portion of the data packet;

an input switch for streaming across the memory banks uniform portions of the data packet such that consecutive cells associated with the data packet are stored in consecutive banks of the distributed memory;

a controller for determining packet routing through the router;

an output switch for extracting in order the portions of the data packet stored in the global data area of each memory bank including reassembling the cells in proper order to reconstruct the data packet formatted in accordance with the first protocol and forwarding the data packet to an appropriate output port; and an output port for transferring the data packet to the destination.

2. An apparatus for use in a router, the router for switching data packets from a source to a destination in a network, the router including one or more input ports for receiving data packets, a divider for dividing the data packets into uniform portions without changing the format of the data packet and one or more output ports operable to forward the data packets to other devices on the network based on routing decisions made by the router, the apparatus comprising:

a distributed memory comprising a plurality of physically separated memory banks;

a switch coupled to the divider operable to stream the uniform portions to the memory banks where consecutive cells associated with a data packet are stored in consecutive memory banks;

each memory bank operable to store uniform portions of a data packet received from the source and linking information to allow for the extraction of the uniform portions of the data packet from the plurality of memory banks in proper order after a routing determination has been made by the rout4er such that the data packet as originally formatted can be routed to another device in the network.

3. The apparatus of claim 2 wherein the distributed memory includes an output queue for storing a notification indicative of the routing of the data packet through the router.

4. The apparatus of claim 3 wherein the notification includes linking information for retrieving at least a first cell of the data packet from the distributed memory.

5. The apparatus of claim 4 wherein the notification includes linking information for the first 5 cells of the data packet.

6. The apparatus of claim 3 wherein the notification includes an address for an indirect cell, the indirect cell stored in the distributed memory and including linking information for extracting cells in order from the distributed memory.

7. The apparatus of claim 3 wherein each memory bank includes a global data area for storing portions of data packets and a notification area for storing notifications.

8. The apparatus of claim 7 wherein the notification area is sized to be ⅕ of a size of the global data area for a given memory bank.

9. The apparatus of claim 8 further including a plurality of multi-function multiports, each multi-function multiport including one or more input ports and output ports for receiving and transmitting data packets through the router.

10. The apparatus of claim 9 wherein a portion of the distributed memory is located within each multi-function multiport such that each multi-function multiport includes a memory bank having a global data area and a notification area.

11. The apparatus of claim 10 wherein the notification area of a given multi-function multiport stores notifications for data packets to be routed through an output port of the given multi-function multiport.

12. The apparatus of claim 2 wherein memory reads and writes to and from the distributed memory are sized to be 64 bytes.

13. The apparatus of claim 2 further including mapping means for mapping from a virtual address space to a physical address space associated with the distributed memory, the mapping means for detecting aged packets in memory and allowing for easy overwriting thereof such that garbage collection of aged packets is not required.

14. A method of routing a data packet through a router in a system transmitting data packets between a source and a destination over a network including the router, the method comprising:

receiving the data packet;

dividing the data packet into cells of a fixed size;

storing the cells in a distributed memory, the distributed memory including two or more memory banks where consecutive cells from the data packet are stored in consecutive banks of the distributed memory; and storing linking information in one bank of the memory for linking cells of the data packet that are stored throughout the distributed memory, the linking information used for extracting the cells in order for transmission from the router to the destination.

15. A method of storing a data packet in a router while a look-up engine determines a proper path through the router for the data packet in a system transmitting data packets between a source and a destination over a network including the router, the method comprising:

dividing the data packet into fixed length cells without changing the formatting of the data packet;

storing the cells and linking information for reconstructing the data packet across a global data buffer, the global data buffer including two or more memory banks where the data packet is divided among the memory banks including storing consecutive cells associated with a data packet in consecutive memory banks of the global data buffer; and a switch for gathering cells associated with the data packet from the global data buffer and reconstructing the data packet prior to forwarding the packet to the destination.

16. A method for determining which data packets stored in a router are to be passed through the router in a system transmitting data packets between a source and a destination over a network including the router, the method comprising:

determining a route through the router for a data packet, the route including a notification indicating a starting address in memory where the data packet is stored;

processing the notification including queuing the notification with other notifications to be output on the same output port of the router in a stream queue;

determining the fullness of the stream queue;

determining a drop criterion based in part on fullness of the stream queue;

generating a random number;

comparing the random number and the drop criterion and dropping the notification based upon results of the comparison.

17. The method of claim 16 wherein the step of determining the fullness of the stream queue is performed when the data packet reaches a head of the stream queue.

18. The method of claim 16 wherein the fullness is a percentage and the random number generated is between zero and one.

* * * * *